(12) United States Patent
Park et al.

(10) Patent No.: US 12,111,756 B2
(45) Date of Patent: Oct. 8, 2024

(54) SYSTEMS, METHODS, AND APPARATUS FOR WEAR-LEVEL AWARE MEMORY ALLOCATION

(71) Applicant: Samsung Electronics Co., Ltd., Suwon-si (KR)

(72) Inventors: Heekwon Park, San Jose, CA (US); Yang Seok Ki, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 114 days.

(21) Appl. No.: 17/396,550

(22) Filed: Aug. 6, 2021

(65) Prior Publication Data

US 2022/0391317 A1 Dec. 8, 2022

Related U.S. Application Data

(60) Provisional application No. 63/194,922, filed on May 28, 2021.

(51) Int. Cl.
*G06F 12/02* (2006.01)

(52) U.S. Cl.
CPC .... *G06F 12/023* (2013.01); *G06F 2212/1036* (2013.01)

(58) Field of Classification Search
None
See application file for complete search history.

(56) References Cited

U.S. PATENT DOCUMENTS

| | | | |
|---|---|---|---|
| 5,893,144 A | 4/1999 | Wood et al. | |
| 8,438,325 B2 | 5/2013 | Reid et al. | |
| 8,954,650 B2 | 2/2015 | Belgal et al. | |
| 10,101,934 B1 | 10/2018 | Ben-Moshe et al. | |
| 2008/0301256 A1* | 12/2008 | McWilliams | G06F 12/0806 714/E11.178 |
| 2010/0205363 A1* | 8/2010 | Hwang | G11C 29/883 711/170 |
| 2013/0332690 A1* | 12/2013 | Seo | G06F 12/0223 711/170 |
| 2013/0339574 A1 | 12/2013 | Franceschini et al. | |

(Continued)

OTHER PUBLICATIONS

European Extended Search Report for Application No. 22172235.8, mailed Oct. 11, 2022.

(Continued)

*Primary Examiner* — Charles Rones
*Assistant Examiner* — Ryan Dare
(74) *Attorney, Agent, or Firm* — Renaissance IP Law Group LLP

(57) ABSTRACT

A method for memory allocation may include determining an amount of use for a first memory page, wherein the first memory page is mapped to a first page group of a first group level, a second memory page may be mapped to a second page group of the first group level, and the first memory page and the second memory page may be mapped to a third page group of a second group level, and selecting, based on an allocation request, the first memory page based on the amount of use. The amount of use may include a first amount of use, and the method may further include determining a second amount of use for the second memory page, wherein the first memory page may be selected based on the first amount of use and the second amount of use.

20 Claims, 21 Drawing Sheets

(56) References Cited

U.S. PATENT DOCUMENTS

2019/0018808 A1\* 1/2019 Beard ................. G06F 12/0826
2021/0011864 A1 1/2021 Bernat et al.
2021/0271400 A1\* 9/2021 Hasegawa ............. G06F 3/0653

OTHER PUBLICATIONS

Moraru, Iulian et al., "Consistent, Durable, and Safe Memory Management for Byte-addressable Non Volatile Main Memory", TRIOS '13: Proceedings of the First ACM SIGOPS Conference on Timely Results in Operating Systems, Nov. 2013, 17 pages.

Park, Heekwon et al., "iBuddy: Inverse Buddy for Enhancing Memory Allocation/Deallocation Performanceon Multi-Core Systems", IEEE Transactions on Computers, vol. 64, No. 3, Mar. 2015, pp. 720-732.

Seo, Dongyoung et al., "WAM: Wear Wear-Out-Aware Memory Management for SCRAM-Based Low Power Mobile Systems", IEEE Transactions on Consumer Electronics, vol. 59, No. 4, Nov. 2013, pp. 803-810.

\* cited by examiner

SYSTEMS, METHODS, AND APPARATUS FOR WEAR-LEVEL AWARE MEMORY ALLOCATION

CROSS-REFERENCE TO RELATED APPLICATIONS

This application claims priority to, and the benefit of, U.S. Provisional Patent Application Ser. No. 63/194,922 titled "Systems, Methods, and Devices for Wear-Leveling Aware Memory Allocation" filed May 28, 2021 which is incorporated by reference.

TECHNICAL FIELD

This disclosure relates generally to memory allocation, and more specifically to systems, methods, and apparatus for wear-level aware memory allocation.

BACKGROUND

A memory allocation scheme may allocate memory from a memory pool to a process such as a program, an application, a service, and/or the like, in response to an allocation request from the process. The amount of memory allocated to a process may be based on one or more factors such as the amount of memory the process may use to perform one or more operations, the amount of memory available in the memory pool, and/or the like. After the process completes the one or more operations, the memory may be deallocated from the process and returned to the memory pool.

The above information disclosed in this Background section is only for enhancement of understanding of the background of the invention and therefore it may contain information that does not constitute prior art.

SUMMARY

A method for memory allocation may include determining an amount of use for a first memory page, wherein the first memory page is mapped to a first page group of a first group level, a second memory page may be mapped to a second page group of the first group level, and the first memory page and the second memory page may be mapped to a third page group of a second group level, and selecting, based on an allocation request, the first memory page based on the amount of use. The amount of use may include a first amount of use, and the method may further include determining a second amount of use for the second memory page, wherein the first memory page may be selected based on the first amount of use and the second amount of use. The method may further include allocating the first memory page to a process. The first amount of use may be based on a write count for the first memory page. The first amount of use may be based on an allocation count for the first memory page. The method may further include associating the first memory page with the second group level based on the first amount of use and the second amount of use. The second group level may be a highest group level. selecting the first memory page may include searching a data structure based on the first amount of use, and selecting a free list based on searching the data structure. The data structure may include a tree comprising a node for the first amount of use, and the node may include the free list. Selecting the first memory page may further include selecting the first memory page from the free list based on the group level of the first memory page. The first amount of use may include a lowest amount of use, and the group level of the first memory page may include a highest group level. The method may further include removing the first memory page from the free list. The method may further include updating a page state map for the first memory page and the second memory page based on removing the first memory page from the free list. An entry of the page state map may include an amount of use. The method may further include generating the data structure based on the page state map. The first memory page and the second memory page may be consecutive memory pages, and the method may further include coalescing the first memory page and the second memory page to generate a group of coalesced memory pages based on the allocation request, and allocating the group of coalesced memory pages to one or more processes. Selecting the first memory page and selecting the second memory page may include searching a data structure based on the first amount of use, and selecting a free list based on searching the data structure. Selecting the first memory page and selecting the second memory page may further include selecting the first memory page from the free list based on the group level of the first memory page, and selecting the second memory page may include selecting a memory page that may be consecutive with the first memory page. The memory page that may be consecutive with the first memory page may include a buddy page of the first memory page. Selecting the free list may include selecting a free list corresponding to a lowest amount of use having an available page corresponding to the group level for the first memory page. The method may further include storing the first amount of use in a memory, and reading, by a host memory allocator, the first amount of use. Storing the first amount of use in the memory may include storing, by the host memory allocator, a first allocation count for the first memory page in the memory. Storing the first amount of use in the memory may include storing, by a device, a first write count for the first memory page in the memory, and the memory may include a device-attached memory attached to the device.

A method for memory deallocation may include determining a first amount of use for a first memory page and a second amount of use for a second memory page, wherein the first memory page is mapped to a first page group of a first group level, the second memory page is mapped to a second page group of the first group level, and the first memory page and the second memory page are mapped to a third page group of a second group level, deallocating the first memory page from a process, and updating a page state map for the first memory page and the second memory page based on the first amount of use. The first memory page may be consecutive with the second memory page, and updating the page state map may include associating the first memory page with the first group level based on the first amount of use and the second amount of use. Updating the page state map may include associating the second memory page with the second group level based on the first amount of use and the second amount of use. The second amount of use may be less than the first amount of use. The first memory page may be consecutive with the second memory page, and updating the page state map may include associating the first memory page with the second group level based on the first amount of use and the second amount of use.

An apparatus may include a memory allocator configured to select, based on an allocation request, a first memory page from a free list comprising a first entry for the first memory page at a group level and a second entry for a second memory page at the group level. The group level may include a first group level, and the memory allocator may be configured to allocate the first memory page at the first group level to one of one or more processes, and allocate the second memory page and a third memory page at a second group level to the one or more processes, wherein the third memory page may be consecutive with the second memory page. The free list may include a third entry for the third memory page at the first group level. The memory allocator may be configured to coalesce the second memory page and the third memory page based on the allocation request.

A system may include a device including a first memory page and a second memory page, and a host coupled to the device through an interconnect, the host comprising a memory allocator configured to determine an amount of use for the first memory page, wherein the first memory page may be mapped to a first page group of a first group level, the second memory page may be mapped to a second page group of the first group level, and the first memory page and the second memory page may be mapped to a third page group of a second group level, and select, based on an allocation request, the first memory page based on the amount of use. The amount of use may include a first amount of use, and the memory allocator may be further configured to determine a second amount of use for the second memory page, wherein the first memory page may be selected based on the first amount of use and the second amount of use.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Figure 1:
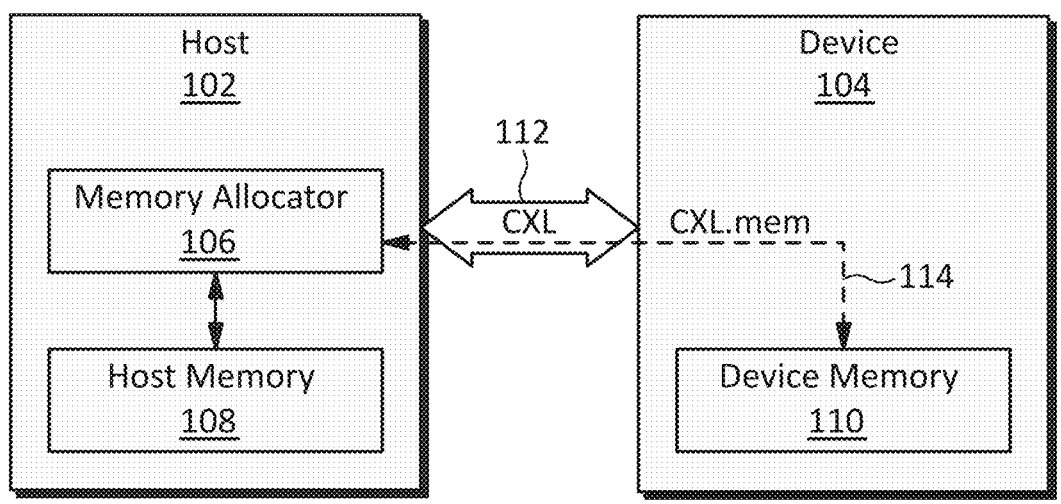
FIG. 1 illustrates an embodiment of a system in which a host may access device-attached memory in accordance with example embodiments of the disclosure.

In some embodiments, a buddy memory allocation scheme may include memory pages arranged to be allocated individually, or in groups of consecutive pages that may be referred to as buddy pages. The groups may be arranged in levels wherein groups at higher levels may include more consecutive buddy pages. When individual pages are deallocated, they may be coalesced into groups with other consecutive free buddy pages.

In some embodiments, a buddy memory allocator may re-allocate memory pages that have recently been deallocated, while it may allow other memory pages to remain unused. If this type of scheme is used with memory having a limited write endurance (e.g., not-AND (NAND) flash memory, phase-change memory (PCM), and/or the like), it may cause uneven wear and/or early memory device failure.

Some buddy memory allocation schemes in accordance with example embodiments of the disclosure may consider an amount of use of one or more memory pages when allocating memory pages in response to an allocation request. For example, a memory page with a lower amount of use may be allocated before other memory pages with higher amounts of use. In some embodiments, an amount of use may indicate a value of a parameter such as a wear-out-level (WOL), for example, of a memory type having a limited endurance (e.g., read and/or write endurance). Depending on the implementation details, this may enable the memory pages to wear more evenly, which in turn, may extend the life of the memory. For purposes of illustration, some embodiments may be described below in contexts in which an amount of use may indicate a wear-out-level, but the principles may be applied to any other parameter having a value that may be indicated by an amount of use.

In some embodiments, a wear-level aware allocation scheme may implement one or more page management features in accordance with example embodiments of the disclosure. These features may have independent utility and may be embodied individually, and not every embodiment may utilize every feature. Moreover, the features may also be embodied in various combinations, some of which may amplify the benefits of the individual features in a synergistic manner. For example, depending on the implementation details, one or more of the page management features may enable a wear-level aware allocation scheme to allocate consecutive (e.g., buddy) pages and/or page groups while managing pages individually.

Some page management features in accordance with example embodiments of the disclosure may involve allocating memory pages starting from a highest group level, wherein pages with the lowest wear-out-levels may be assigned to the highest group level. Depending on the implementation details, this may enable a wear-level aware allocation scheme to implement a single-page allocation mechanism having a relatively low complexity of O(1). This may be particularly beneficial because, in some applications, single-page allocations may account for a large percentage of allocation requests.

Some additional page management features in accordance with example embodiments of the disclosure may involve the use of one or more hybrid data structures. For example, a data structure for a ware-level aware allocation scheme may include (1) a wear-level tree having nodes based on ware-out-levels, (2) a free list associated with each node to manage free pages, and/or (3) a page state map to check the free status and/or wear-out-level of buddy pages and/or page groups. In some embodiments, in response to an allocation request, a page management algorithm may search the tree for the node having the lowest wear-out-level. The algorithm may then select a memory page from the highest level of a free list associated with the node having the lowest wear-out-level. The algorithm may then clear an entry from the corresponding group level of the page state map and/or remove the selected memory page from the free list.

Some further page management features in accordance with example embodiments of the disclosure may involve on-demand coalescing of free memory pages. For example, in some embodiments, a page management algorithm may not coalesce pages when pages are freed by deallocation. Instead, the page management algorithm may coalesce pages when an allocation request for multiple consecutive pages is received. Depending on the implementation details, this may improve the management of individual pages that may have different wear-out-levels.

Some additional page management features in accordance with example embodiments of the disclosure may involve comparing the wear-out-level of a deallocated memory page with the wear-out-level of a buddy page or page group. If the wear-out-level of the buddy page is lower than the wear-out-level of the deallocated page, the buddy page may be promoted in the page state map, and the deallocated page may be inserted in the page state map at the original level of the buddy page. In some embodiments, a wear-level tree and one or more corresponding free lists may be updated based on the revisions to the page state map.

In some embodiments, a wear-level aware allocation scheme may monitor the wear-out-level of one or more memory pages, for example, using a write count, an allocation count, and/or any other suitable technique. The wear-out-level of each page may be stored, for example, in a reserved space of a device attached memory.

FIG. 1 illustrates an embodiment of a system in which a host may access device-attached memory in accordance with example embodiments of the disclosure. The system illustrated in FIG. 1 may include a host 102 and a device 104. The host 102 may include a memory allocator 106 and a host memory 108. The memory allocator 106 may be implemented, for example, as a buddy memory allocator. The host memory 108 may be implemented with any type of memory, for example, volatile memory such as dynamic random access memory (DRAM), static random access memory (SRAM), and/or the like.

The device 104 may include a device memory 110. The device 104 may be implemented, for example, as a storage device such as a solid state drive (SSD) in which the device memory 110 may be implemented with nonvolatile memory (NVM) such as NAND flash memory. In other embodiments, however, any other type of device and/or device memory may be used.

Figure 2:
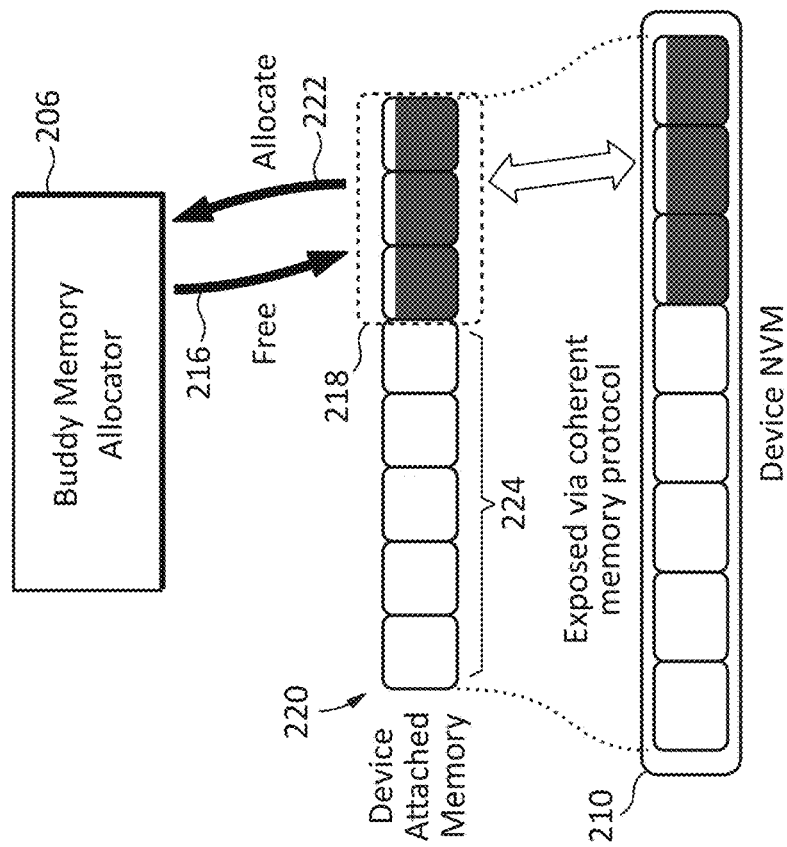
FIG. 2 illustrates an embodiment of a buddy memory allocation method in accordance with example embodiments of the disclosure.

The host 102 and device 104 may communicate through any type of interconnect 112 such as Compute Express Link (CXL). The host 102 may access the device memory 110 through the interconnect 112 using any type of protocol. In the embodiment illustrated in FIG. 1, the host 102 may access the device memory 110 using the CXL.mem protocol 114 which may operate over the CXL interconnect 112. The CXL.mem protocol may expose the device memory to the host 102 in a manner that may enable the memory allocator 106 to allocate device memory 110 as if it were part of the host memory 108, FIG. 2 illustrates an embodiment of a buddy memory allocation method in accordance with example embodiments of the disclosure. The embodiment illustrated in FIG. 2 may be implemented, for example, using the system illustrated in FIG. 1.

Referring to FIG. 2, as illustrated by operation 216, a buddy memory allocator 206 may deallocate a group 218 of device attached memory pages 220. (Deallocating a memory page may also be referred to as freeing a memory page.) The device attached memory pages 220 may be implemented, for example, as nonvolatile memory (NVM) 210 which may be exposed through a memory access protocol such as CXL.mem.

The buddy memory allocator 206 may be intended for use with memory without wear limitations such as DRAM. Therefore, when the buddy memory allocator 206 receives an allocation request, it may once again allocate one or more of the pages in the group 218 of recently deallocated memory pages, as shown by operation 222, before allocating any of the remaining pages 224. The amount of shading shown in the memory pages 220 may indicate a wear-out-level (e.g., a number of times written). Thus, the memory pages in group 218 may wear out relatively quickly, while the remaining memory pages 224 may be subjected to little or no wear.

Figure 3:
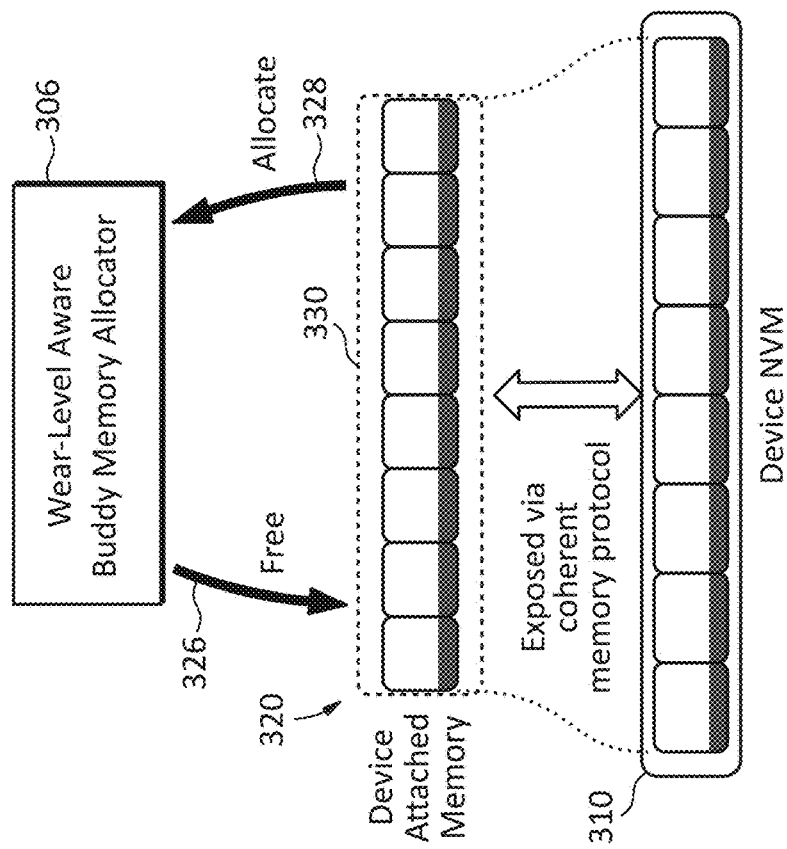
FIG. 3 illustrates an embodiment of a memory allocation method with wear-level awareness in accordance with example embodiments of the disclosure.

FIG. 3 illustrates an embodiment of a memory allocation method with wear-level awareness in accordance with example embodiments of the disclosure. The embodiment illustrated in FIG. 2 may be implemented, for example, using the system illustrated in FIG. 1 in which the memory allocator 106 may be reconfigured to operate as a wear-level aware buddy memory allocator 306 as follows.

The wear-level aware buddy memory allocator 306 may have access to wear-out-level information for the pages of device-attached memory 320. The device-attached memory 320 may be implemented, for example, as nonvolatile memory (NVM) 310 which may be exposed through a memory access protocol such as CXL.mem. The wear-out-level information may be provided to the memory allocator 306 as write count information from a device at which the device-attached memory 320 is located (e.g., device 104 in FIG. 1). Alternatively, or additionally, the memory allocator 306 may record and use allocation count information for the pages of device-attached memory 320 as wear-out-level information. Any other source of wear-out-level information may be used.

The wear-level aware memory allocator 306 may coordinate one or more deallocate operations 326 and allocate operations 328 to fairly and/or evenly allocate memory pages based on the wear-out-level of one or more pages. For example, in some embodiments, one or more pages and/or buddy pages having a lowest wear-out-level among the entire group 330 of device-attached memory 320 may be allocated in response to an allocation request. At the next allocation request, the wear-level aware memory allocator 306 may again select one or more pages and/or buddy pages having a lowest wear-out-level among the entire group 330, regardless of when any particular page was deallocated. Depending on the implementation details, this may enable the pages of device-attached memory 320 to wear more evenly as shown by the relatively uniform shading level of each page of the device-attached memory 320.

In some embodiments, a page of memory may be allocated to a process such as a program, an application, a service, and/or the like. In some embodiments, a page of memory may be deallocated from a process such as a program, an application, a service, and/or the like.

For purposes of illustration, some embodiments may be described in the context of device-attached memory. However, the principles relating to wear-level aware memory allocation may be applied in any memory allocation context in which memory having a limited read and/or write endurance may be allocated. For example, the principles may be applied to an embodiment in which a memory allocator in a host may only have access to host memory, at least some of which may be wear limited (e.g., PCM, flash memory, and/or the like). Moreover, the page size may be implemented with any size such as 512 bytes, 4K bytes, 8K bytes, and/or the like, and/or any combinations thereof.

For purposes of illustration, some embodiments may be described in the context of CXL interfaces and/or protocols. However, embodiments may also be implemented with any other interfaces and/or protocols including cache coherent and/or memory semantic interfaces and/or protocols such as Gen-Z, Coherent Accelerator Processor Interface (CAPI), Cache Coherent Interconnect for Accelerators (CCIX), and/or the like. Other examples of suitable interfaces and/or protocols may include Peripheral Component Interconnect Express (PCIe), Nonvolatile Memory Express (NVMe), NVMe-over-fabric (NVMe-oF), Ethernet, Transmission Control Protocol/Internet Protocol (TCP/IP), remote direct memory access (RDMA), RDMA over Converged Ethernet (ROCE), FibreChannel, InfiniBand, Serial ATA (SATA), Small Computer Systems Interface (SCSI), Serial Attached SCSI (SAS), iWARP, and/or the like, or combination thereof.

Referring again to FIG. 1, the device 104 may be implemented with any type of device such as a storage device, an accelerator device, a network interface card (NIC), a graphics processing unit (GPU), and or the like. A storage device used as the device 104 may be based on any type of storage media including magnetic media, solid state media, optical media, and/or the like. For example, in some embodiments, the device 104 may be implemented as a solid state drive (SSD) based on not-AND (NAND) flash memory, persistent memory such as cross-gridded nonvolatile memory, memory with bulk resistance change, and/or the like, and/or any combination thereof. Such a storage device may be implemented in any form factor such as 3.5 inch, 2.5 inch, 1.8 inch, M.2, Enterprise and Data Center SSD Form Factor (EDSFF), NF1, and/or the like, using any connector configuration such as Serial ATA (SATA), Small Computer System Interface (SCSI), Serial Attached SCSI (SAS), U.2, and/or the like. Such a storage device may be implemented entirely or partially with, and/or used in connection with, a server chassis, server rack, dataroom, datacenter, edge datacenter, mobile edge datacenter, and/or any combinations thereof, and/or the like.

In some embodiments in which the device 104 is implemented as a storage device (e.g., an SSD), it may include a bus interface, a storage device controller, and a storage medium. The storage device controller may include NVM logic and/or other logic to perform routine background management operations such as a flash translation layer (FTL), a flash interface, and/or the like that may perform garbage collection (GC), wear leveling, recovery from unsafe shutdowns, and/or the like.

Although the embodiment illustrated in FIG. 1 is shown with a single host 102 and a single device 104, any number of hosts 102 and/or devices 104 may be included, as well as one or more switches and/or other components configured to implement the system.

Any of the host 102 (including the memory allocator 106) and/or the device 104 illustrated in FIG. 1, the memory allocator 306 illustrated in FIG. 3, and/or any other components described herein, may implement any of the functionality described herein, and may be implemented with hardware, software, or any combination thereof including combinational logic, sequential logic, one or more timers, counters, registers, state machines, volatile memories such as dynamic random access memory (DRAM) and/or static random access memory (SRAM), nonvolatile memory such as flash memory including NAND flash memory, persistent memory such as cross-gridded nonvolatile memory, memory with bulk resistance change, and/or the like, and/or any combination thereof, complex programmable logic devices (CPLDs), field programmable gate arrays (FPGAs), application specific integrated circuits (ASICs), central processing units (CPUs) such as complex instruction set computer (CISC) processors such as x86 processors and/or reduced instruction set computer (RISC) processors such as ARM processors, graphics processing units (GPUs), neural processing units (NPUs), and/or the like, executing instructions stored in any type of memory. In some embodiments, one or more components may be implemented as a system-on-chip (SOC).

Figure 4A:
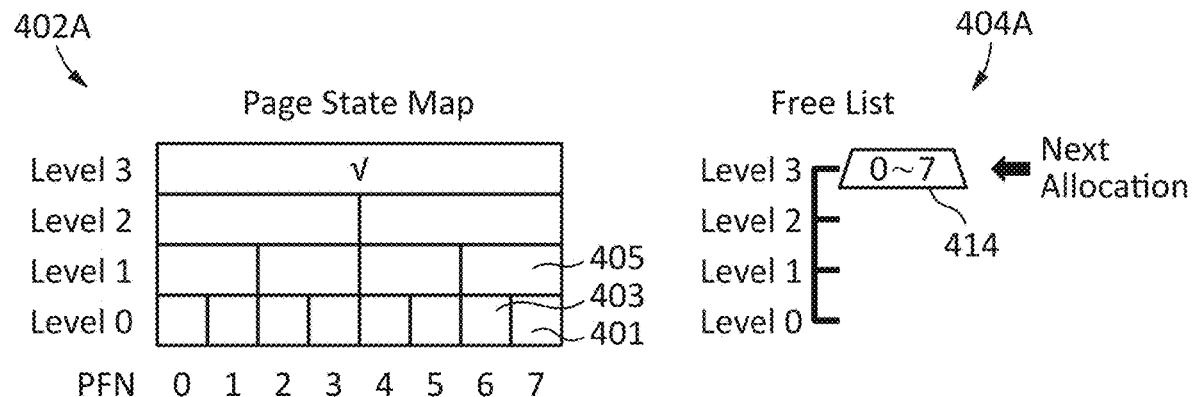
FIG. 4A illustrates an example embodiment of data structures for a buddy memory allocation method having grouped page management, wherein the data structures are shown in a first state before allocating a page in accordance with example embodiments of the disclosure.

FIG. 4A illustrates an example embodiment of data structures for a buddy memory allocation method having grouped page management, wherein the data structures are shown in a first state before allocating a page in accordance with example embodiments of the disclosure. The embodiment illustrated in FIG. 4A may include a page state map 402A and a free list 404A. In this example, the page state map 402A may map eight memory pages indicated by page frame numbers (PFN) 0 through 7 that may be grouped into four different group levels indicated by Level 0 through Level 3. Level 0 may indicate individual memory pages. Level 1 may indicate groups of two consecutive buddy pages. For example, the memory pages at PFN 0 and PFN 1 may be grouped into a group of two buddy pages at Level 1. Similarly, the memory pages at PFN 0 through PFN 3 may be grouped into a group of four consecutive buddy pages at Level 2, and the memory pages at PFN 0 through PFN 7 may be grouped into a group of eight consecutive buddy pages at Level 3.

Thus, memory pages may be mapped to different page groups at different group levels. For example, as shown in FIG. 4A, a first memory page at PFN 7 may be mapped to a first page group 401 (which in this example may include a single page) at Level 0. A second memory page at PFN 6 may be mapped to a second page group 403 (which in this example may also include a single page) at Level 0. The two memory pages at PFN 6 and PFN 7 may be mapped to a third page group 405 at Level 1.

In the page state map 402A and other page state maps mentioned herein, Level 0 may indicate a level having groups of $2^0$ memory pages, Level 1 may indicate a level having groups of $2^1$ memory pages, Level 2 may indicate a level having groups of $2^2$ memory pages, and Level 3 may indicate a level having groups of $2^3$ memory pages. In some embodiments, any other page group sizes may be used.

The page state map 402A may be used to check whether a buddy for any specific page or group of pages is free. In the page state illustrated in FIG. 4A, the check mark in the group at Level 3 may indicate that all eight pages mapped by the page stage map 402A are free.

The free list 404A, which may be used to manage free pages in groups, may include four group levels Level 0 through Level 3 corresponding to the group levels of the page state map 402A. In this example, pages may be managed in groups, and because all eight pages are free, all eight pages may be included in the entry 414 at Level 3. Thus, a page from the entry 414 at Level 3 may be allocated in response to the next allocation request.

In an embodiment of a buddy memory allocation method using the page state map 402A and the free list 404A, when a buddy memory allocator receives an allocation request, may begin looking for a free page or group of pages starting at the lowest level. For example, if the buddy memory allocator receives a request for a single-page allocation, it may begin looking for a free page at Level 0 of the free list 404A. Because Level 0 of the free list 404 is empty, the allocator may continue checking at progressively higher levels (e.g., lowest-to-highest) until it finds a free page. In this example, a free page may not be found until the allocator reaches Level 3. In this embodiment, there may be no basis for selecting any of the pages at PFN 0 through PFN 7. For purposes of illustration, page 0 may be selected for allocation, for example, based on a random selection or based on a predetermined pattern (e.g., lowest PFN first, highest PFN first, and/or the like).

Figure 4B:
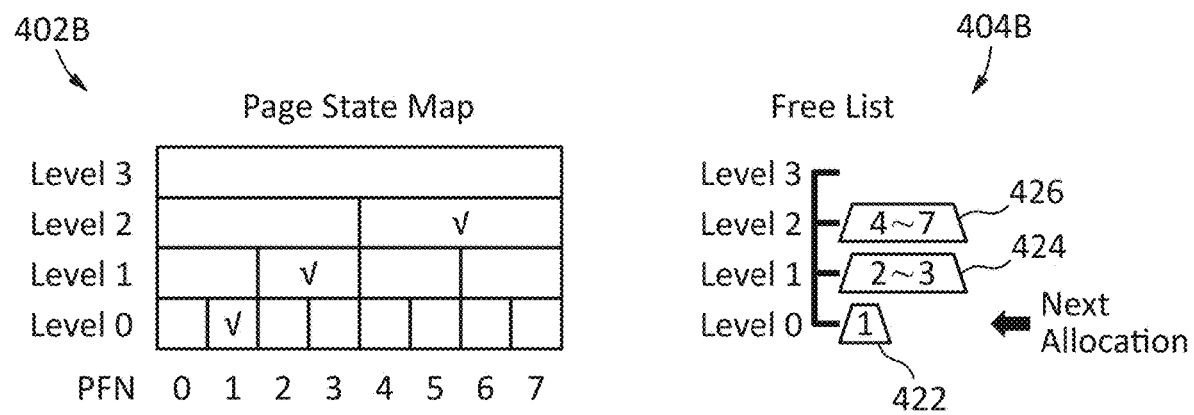
FIG. 4B illustrates the example embodiment of data structures for a buddy memory allocation method having grouped page management, wherein the data structures are shown in a second state after allocating a page in accordance with example embodiments of the disclosure.

FIG. 4B illustrates the example embodiment of data structures for a buddy memory allocation method having grouped page management, wherein the data structures are shown in a second state after allocating a page in accordance with example embodiments of the disclosure. The example embodiment illustrated in FIG. 4B may illustrate the state of the data structures shown in FIG. 4A after allocating the memory page at PFN 0. Thus, FIG. 4A and FIG. 4B may collectively illustrate a page allocation method having grouped page management in accordance with example embodiments of the disclosure.

The page state map 402B may show the state of the page state map 402A after allocating the memory page at PFN 0 (which may also be referred to as page 0 or PFN 0). The check mark at the box for PFN 1 at Level 0 may indicate a free page at PFN 1. The check mark at the box for PFN 2 and PFN 3 at Level 1 may indicate a group of two free consecutive buddy pages at PFN 2 and PFN 3. The check mark at the box for PFN 4 through PFN 7 at Level 2 may indicate a group of four free consecutive buddy pages at PFN 4 through PFN 7.

The free list 404B may show the state of the free list 404A after allocating the memory page at PFN 0. The entry 422 at Level 0 may indicate the free page PFN 1 available at Level 0. The entry 424 at Level 1 may indicate the two consecutive free buddy pages PFN 2 and PFN 3 available at Level 1. The entry 426 at Level 2 may indicate the four consecutive free buddy pages PFN 4 through PFN 7 available at Level 2. Thus, after allocating page PFN 0, the remaining free pages may still be managed in groups in the free list 404B. Moreover, because this buddy memory allocation method may begin searching for a free page at the lowest level (Level 0), the memory page at PFN 1 may be allocated in response to the next single-page allocation request.

Figure 5A:
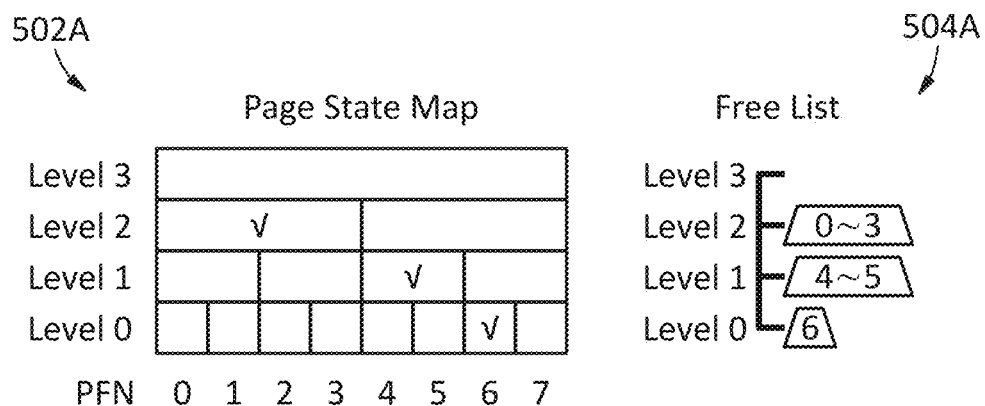
FIG. 5A illustrates an example embodiment of data structures for a buddy memory allocation method having grouped page management, wherein the data structures are shown in a first state before deallocating a page in accordance with example embodiments of the disclosure.

FIG. 5A illustrates an example embodiment of data structures for a buddy memory allocation method having grouped page management, wherein the data structures are shown n a first state before deallocating a page in accordance with example embodiments of the disclosure. The page state map 502A and the free list 504A illustrated in FIG. 5A may be similar to page state map 402B and 404B illustrated in FIG. 4B, respectively, but with entries that may indicate that only PFN 7 is allocated. Specifically, a single memory page at PFN 6 may be available at Level 0 (entry for PFN 6 at Level 0 in free list 504A), a group of two consecutive buddy pages at PFN 4 and PFN 5 may be available at Level 1 (entry for PFN 4 and PFN 5 at Level 1 in free list 504A), and a group of four consecutive buddy pages at PFN 0 through PFN 3 may be available at Level 2 (entry for PFN 0 through PFN 3 at Level 2 of free list 504A). Thus, in the free list 504A, the free pages may be managed in groups.

Figure 5B:
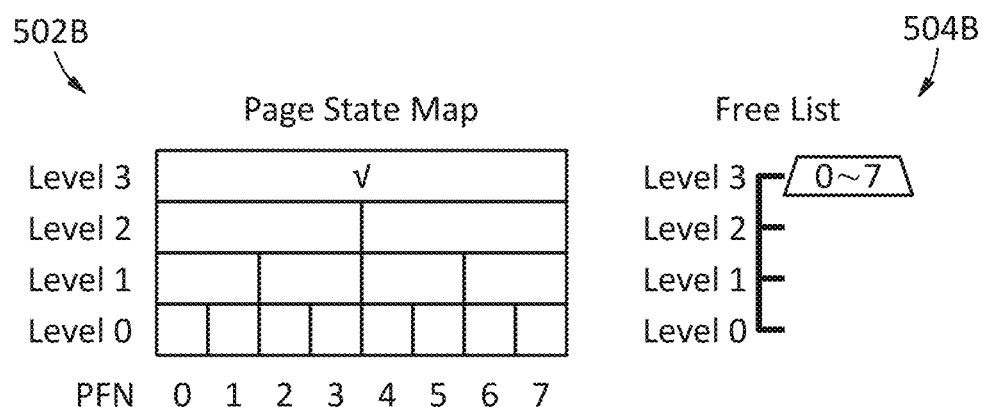
FIG. 5B illustrates an example embodiment of data structures for a buddy memory allocation method having grouped page management, wherein the data structures are shown in a second state after deallocating a page in accordance with example embodiments of the disclosure.

FIG. 5B illustrates an example embodiment of data structures for a buddy memory allocation method having grouped page management, wherein the data structures are shown in a second state after deallocating a page in accordance with example embodiments of the disclosure. The page state map 502B and free list 504B illustrated in FIG. 5B may show the states of the page state map 502A and the free list 504A after deallocating the memory page at PFN 7. Thus, FIG. 5A and FIG. 5B may collectively illustrate a page deallocation method having grouped page management in accordance with example embodiments of the disclosure.

Specifically, when the memory page at PFN 7 is deallocated, the buddy memory allocator may immediately coalesce PFN 7 with its buddy page PFN 6, and the coalesced group of two buddy pages may be moved to Level 1. However, the group PFN 6 and PFN 7 may then be immediately coalesced with PFN 4 and PFN 5, and the coalesced group of four buddy pages may be moved to Level 2. The group PFN 4 through PFN 7 may then be immediately coalesced with PFN 0 through PFN 3, and the coalesced group of eight buddy pages may be moved to Level 3. The coalesced group of eight buddy pages may be reflected in the single entry for PFN 0 through PFN 7 in the free list 504B.

As mentioned above, memory pages implemented with memory having a limited write endurance may have different wear-out-levels, and therefore, it may be advantageous to manage the memory pages individually. However, it may be difficult to provide wear-out management for individual memory pages using the buddy memory allocation method having grouped page management and/or immediate coalescing as illustrated in FIG. 4A, FIG. 4B, FIG. 5A, and FIG. 5B.

Figure 6A:
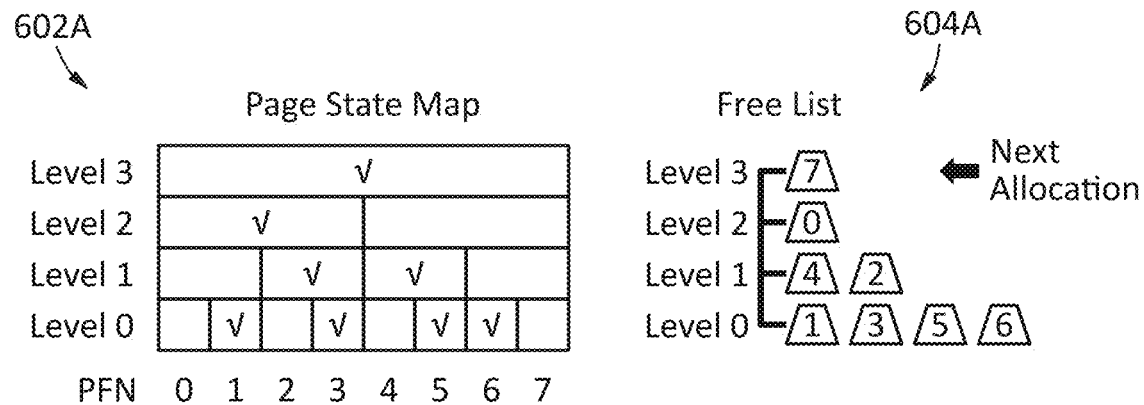
FIG. 6A illustrates an example embodiment of data structures for a buddy memory allocation method having individual page management, wherein the data structures are shown in a first state before allocating a page in accordance with example embodiments of the disclosure.

FIG. 6A illustrates an example embodiment of data structures for a buddy memory allocation method having individual page management, wherein the data structures are shown in a first state before allocating a page in accordance with example embodiments of the disclosure. The embodiment illustrated in FIG. 6A may include a page state map 602A and a free list 604A. In this example, all eight pages PFN 0 through PFN 7 may be free. However, rather than coalescing (e.g., merging) free pages, the page state map 602A may include an entry for each free memory page. These individual page entries may be distributed throughout the group levels to indicate available buddy pages and/or groups of buddy pages. Thus, check marks at Level 0 may indicate individual free pages PFN 1, PFN 3, PFN 5, and PFN 6. Check marks at Level 1 may indicate individual free pages at PFN 2 and PFN 4, which may also be used to form groups of two consecutive buddy pages with PFN 3 and PFN 5, respectively, if requested. A check mark at Level 2 may indicate an individual free page at PFN 0, which may also be used to form a group of four consecutive buddy pages with PFN 1 through PRN 3 if requested. A check mark at Level 3 may indicate an individual free page at PFN 7, which may also be used to form a group of eight consecutive buddy pages with PFN 1 through PFN 6 if requested.

Moreover, the free list 604A may include individual entries for one or more free pages at each group level. Specifically, the free list 604A may include individual entries for the memory pages at PFN 1, PFN 3, PFN 5, and PFN 6 at Level 0, individual entries for the memory pages at PFN 2 and PFN 4 at Level 1, and individual entries for the memory pages at PFN 0 and PFN 7 at Level 2 and Level 3, respectively.

In some embodiments, depending on the implementation details, the individual page management data structures provided by the page state map 602A and/or free list 604A may enable efficient highest-to-lowest group level searching for memory pages to allocate, including individual pages and/or groups of consecutive memory pages. For example, as shown in FIG. 6A, the memory page at PFN 7 may be used for the next page allocation request.

Figure 6B:
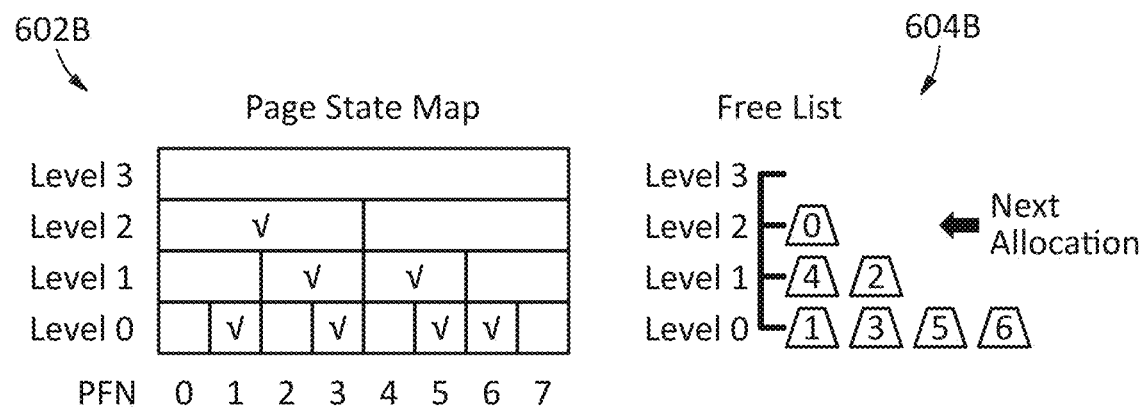
FIG. 6B illustrates an example embodiment of data structures for a buddy memory allocation method having individual page management, wherein the data structures are shown in a second state after allocating a page in accordance with example embodiments of the disclosure.

FIG. 6B illustrates an example embodiment of data structures for a buddy memory allocation method having individual page management, wherein the data structures are shown in a second state after allocating a page in accordance with example embodiments of the disclosure. The example embodiment illustrated in FIG. 6B may illustrate the state of the data structures shown in FIG. 6A after allocating the memory page at PFN 7. Thus, FIG. 6A and FIG. 6B may collectively illustrate a page allocation method having individual page management in accordance with example embodiments of the disclosure.

In this embodiment, due to the structure of the page state map 602B and the free list 604B, and due to the highest-to-lowest searching, the entry for PFN 7 may simply be removed from Level 3 of the page state map 602B and/or Level 3 of the free list 604B without changing any other entries in the page state map 602B and/or the free list 604B. Moreover, because Level 3 is now empty, the next memory page to be allocated may simply move down to the next lower level (Level 2).

Figure 7A:
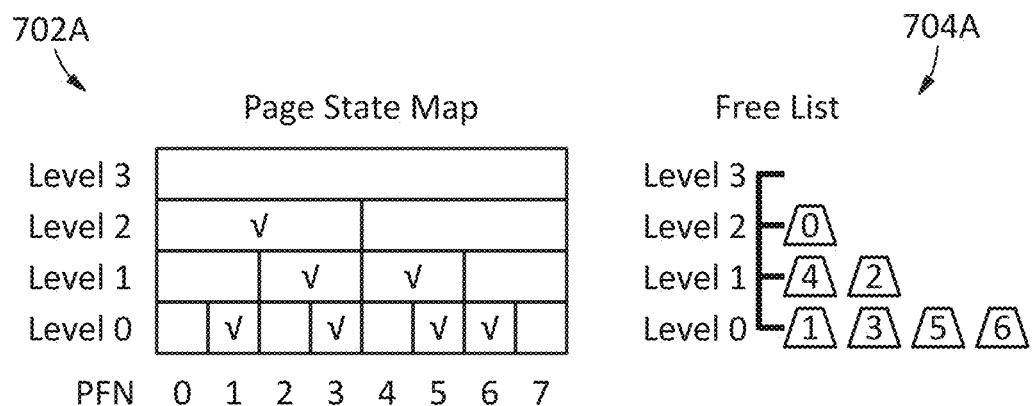
FIG. 7A illustrates an example embodiment of data structures for a buddy memory allocation method having individual page management, wherein the data structures are shown in a first state before deallocating a page in accordance with example embodiments of the disclosure.

FIG. 7A illustrates an example embodiment of data structures for a buddy memory allocation method having individual page management, wherein the data structures are shown in a first state before deallocating a page in accordance with example embodiments of the disclosure. The starting states of the page state map 702A and the free list 704A illustrated in FIG. 7A may be essentially the same as those illustrated in FIG. 6B.

Figure 7B:
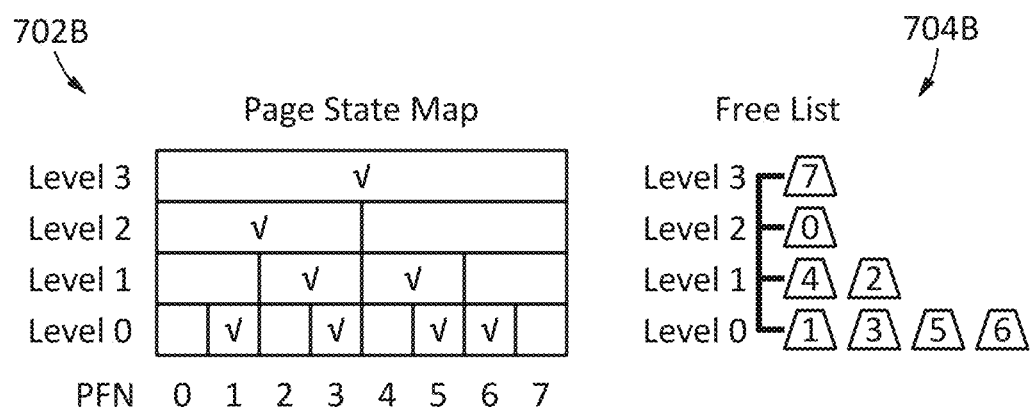
FIG. 7B illustrates an example embodiment of data structures for a buddy memory allocation method having individual page management, wherein the data structures are shown in a second state after deallocating a page in accordance with example embodiments of the disclosure.

FIG. 7B illustrates an example embodiment of data structures for a buddy memory allocation method having individual page management, wherein the data structures are shown in a second state after &allocating a page in accordance with example embodiments of the disclosure. The example embodiment illustrated in FIG. 7B may illustrate the state of the data structures shown in FIG. 7A after deallocating the memory page at PFN 7. Thus, FIG. 7A and FIG. 78 may collectively illustrate a page deallocation method having individual page management in accordance with example embodiments of the disclosure.

In this embodiment, due to the structure of the page state map 7028 and the free list 7043, the entry for PFN 7 may simply be inserted at Level 3 of the page state map 7028 and/or Level 3 of the free list 704B without changing any other entries in the page state map 7023 and/or the free list 7043. Moreover, rather than immediately coalescing available buddy pages and/or page groups when memory page PFN 7 was deallocated, the entries in the page state map 702B and/or the free list 704B may remain as individual page entries.

The embodiments illustrated in FIG. 6A, FIG. 68, FIG. 7A, and FIG. 7B may be implemented, for example, using a buddy memory allocator such as the buddy memory allocator 306 illustrated in FIG. 3.

Figure 8:
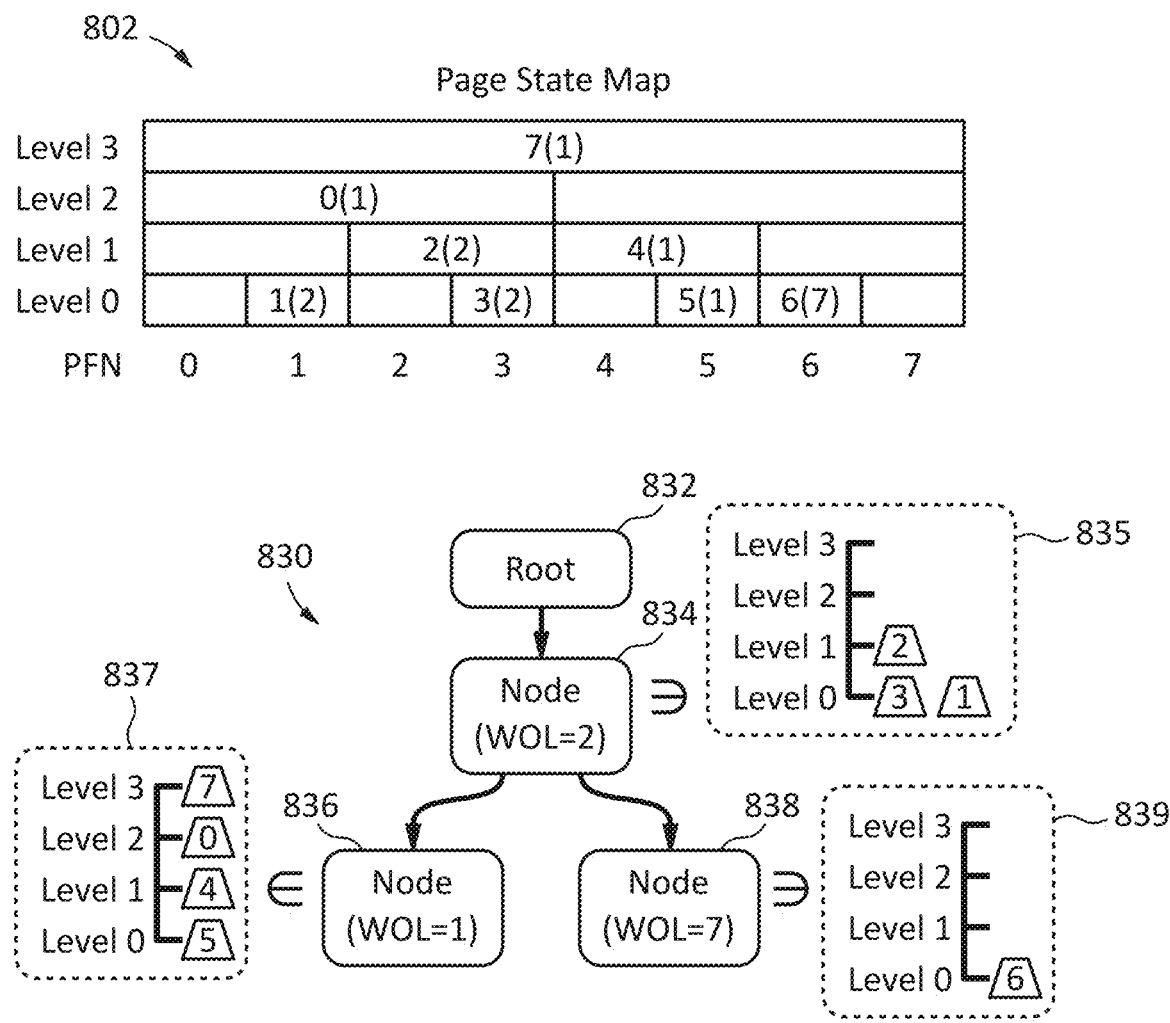
FIG. 8 illustrates an embodiment of data structures for allocating memory pages based on a wear-out-level in accordance with example embodiments of the disclosure.

FIG. 8 illustrates an embodiment of data structures for allocating memory pages based on a wear-out-level in accordance with example embodiments of the disclosure. The embodiment illustrated in FIG. 8 may be implemented, for example, using a buddy memory allocator such as the buddy memory allocator 306 illustrated in FIG. 3.

The embodiment illustrated in FIG. 8 may include a page state map 802 and a tree 830. The page state map 802 may include entries for individual memory pages in a manner similar to the embodiments illustrated in FIG. 6A, FIG. 6B, FIG. 7A, and/or FIG. 73. However, one or more of the entries may each include a page frame number (PFN) for the corresponding memory page and/or an amount of use which may indicate, for example, a wear-out-level (WOL) for the corresponding memory page. For example, in the entry shown as 7(1) at Level 3, the 7 may indicate PFN 7, and the (1) may indicate a WOL of 1. As another example, in the entry shown as 6(7) at Level 0, the 6 may indicate PFN 6, and the (7) may indicate wear-out-level 7. In some embodiments, lower WOL numbers may indicate lower wear-out-levels, and higher WOL numbers may indicate higher wear-out-levels.

The tree 830 may include one or more nodes that may correspond to WOLs for memory pages. For example, in some embodiments, the tree 830 may be implemented with one node for each WOL. Each node of the tree 830 may have one or more associated lists of free memory pages that have the WOL associated with that node. In the example illustrated in FIG. 8, the tree 830 may include a node 834 for WOL=2, a node 836 for WOL=1, and a node 838 for WOL=7.

A list 835 of free memory pages having WOL=2 may be associated with node 834. For example, the list 835 may be an element of the node 834 (as indicated by the symbol e), or the node 834 may include a pointer or link to access the list 835 from the node 834. Similarly, a list 837 of free memory pages having WOL=1 may be associated with node 836, and a list 839 of free memory pages having WOL=7 may be associated with node 838.

In some embodiments, the tree 830 may be implemented with any type of data tree such as a binary search tree, a B-tree, and/or the like, that may be searched to find a node with a specific WOL (e.g., the lowest WOL in the tree). The tree 830 may further include a root node 832 that may serve, for example, as a starting point for a search. In some embodiments, the lists such as 835, 837, and 839 may be implemented with any type of list including singly linked lists, doubly linked lists, and/or the like.

In some embodiments, any or all of the page state map 802, tree 830, and/or lists 835, 837, and 839 may form a hybrid data structure that may enable a buddy memory allocator to implement wear-out (WO) management (e.g., using the tree 830), manage individual free pages (e.g., using lists 835, 837, and/or 839), and/or check the free status and/or WOL of buddy pages and/or groups of pages (e.g., using the page state map 802) in accordance with example embodiments of the disclosure.

In some embodiments, nodes may be added to and/or removed from the tree 830 based on the presence and/or absence of memory pages having a WOL associated with the specific node. For example, if the memory page at PFN 6 is allocated, and no other memory pages have a WOL=7, the node 838 corresponding to WOL=7 may be removed from the tree 830. If the WOL=7 node 838 is removed from the tree 830, the corresponding list 839 may be deleted. Alternatively, the list may be retained in an empty state for reuse if a new node corresponding to WOL=7 is added at a later time. As another example, if one or more pages reach WOL 3, a new node corresponding to WOL 3 may be added to the tree 830, and an associated list of memory pages having WOL 3 may be created.

Figure 9:
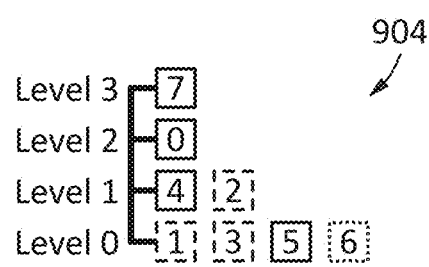
FIG. 9 illustrates an example embodiment of a method for generating a tree and one or more associated WOL-specific free page lists in accordance with example embodiments of the disclosure.
Figure 9:
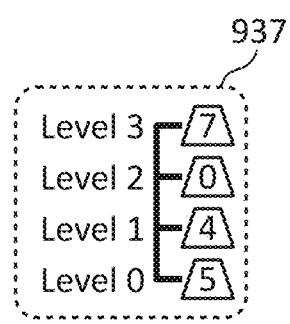
Figure 9:
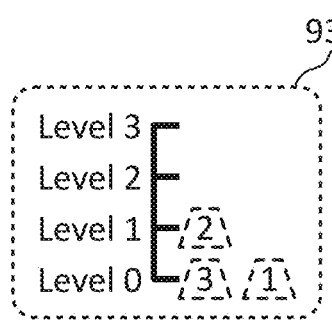
Figure 9:
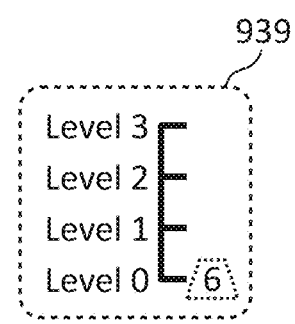

FIG. 9 illustrates an example embodiment of a method for generating a tree 830 and one or more associated WOL-specific free page lists in accordance with example embodiments of the disclosure. The method may begin with a free list 904 similar to the list 604A illustrated in FIG. 6A, but based on the PFN and WOL numbers shown in the entries of the page state map 802 illustrated in FIG. 8.

Referring to FIG. 9, the initial free list 904 may be split into multiple WOL-specific free lists based on the WOL of the individual free pages. For example, the pages having WOL=1 (as indicated by solid outlines) may be collected and inserted into list 937 at their corresponding group levels. The pages having WOL=2 (as indicated by dashed lines) may be collected and inserted into list 935 at their corresponding group levels. The pages having WOL=7 (as indicated by dotted lines) may be collected and inserted into list 939 at their corresponding group levels. In some embodiments, any of the lists 935, 937, and/or 939 may be used for the lists 835, 837, and/or 839, respectively, in FIG. 8.

The method illustrated in FIG. 9 may be implemented with any number of WOL-specific free lists and/or any number of free pages in each list and at each group level. A corresponding tree such as the tree 830 illustrated in FIG. 8 may be updated to include as many nodes are there are resulting free lists.

Figure 10A:
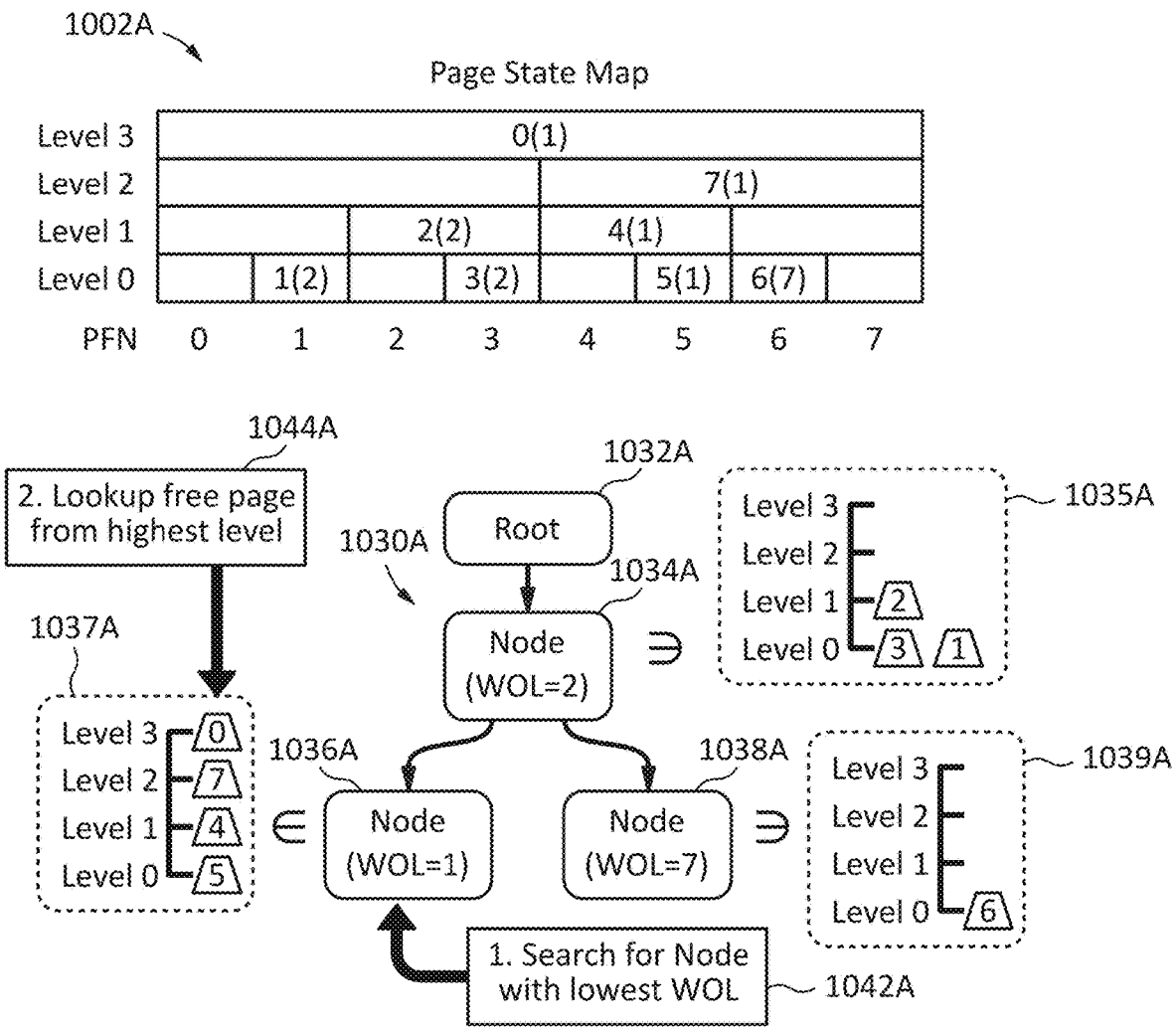
FIG. 10A illustrates an example embodiment of a wear-level aware buddy page allocation method showing data structures in a first state prior to a page allocation in accordance with example embodiments of the disclosure.
Figure 10B:
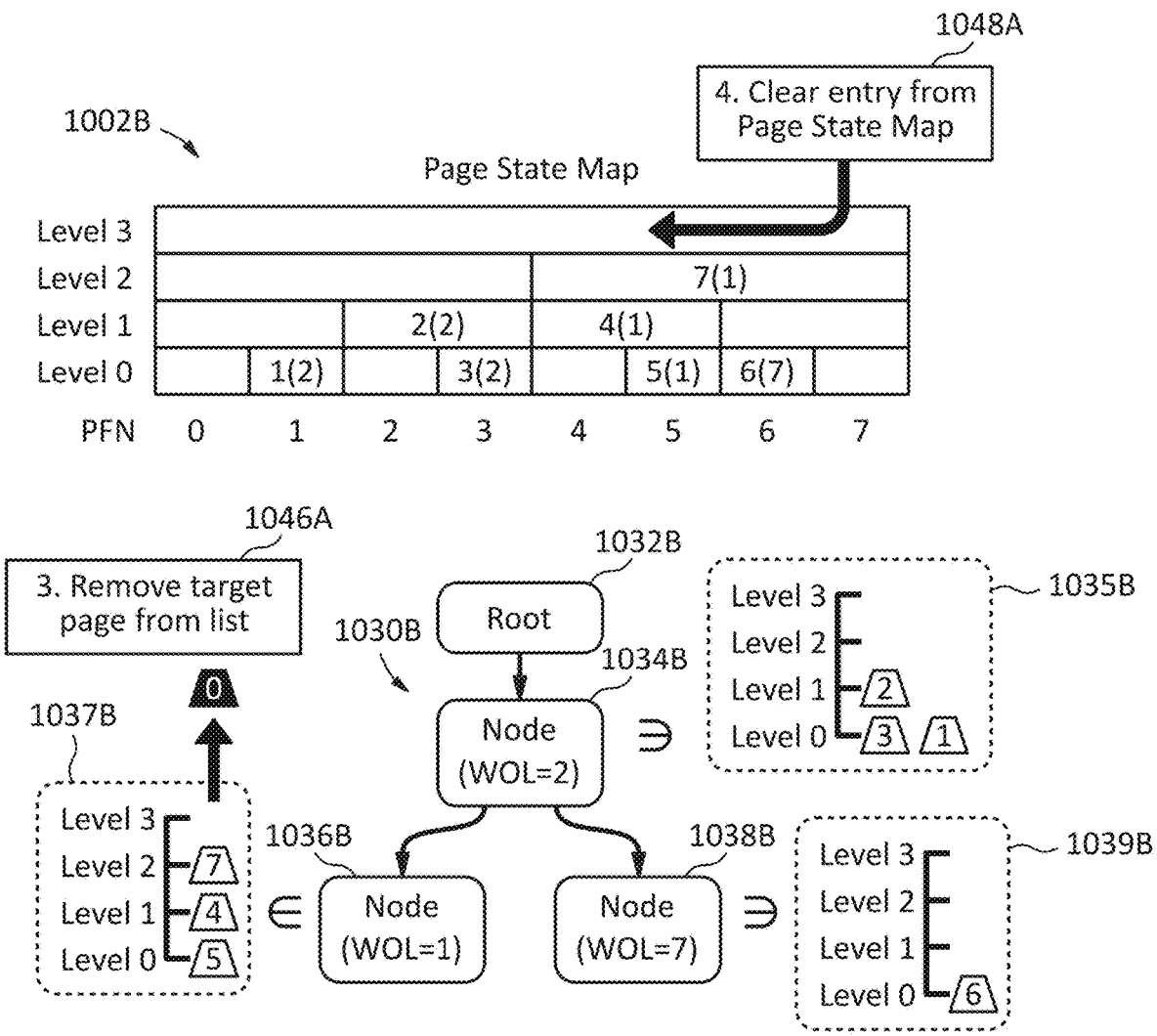
FIG. 10B illustrates an example embodiment of a wear-level aware buddy page allocation method showing data structures in a second state after a page allocation in accordance with example embodiments of the disclosure.

FIG. 10A and FIG. 10B, which collectively form FIG. 10, illustrate an example embodiment of a wear-level aware buddy page allocation method in accordance with example embodiments of the disclosure. The embodiment illustrated in FIG. 10 may be implemented, for example, using a hybrid data structure similar to that illustrated in FIG. 8, and a buddy memory allocator similar to that illustrated in FIG. 3. The method illustrated in FIG. 10 may be initiated, for example, by a single-page allocation request received by a buddy memory allocator.

Referring to FIG. 10A, the initial states of a page state map 1002A and a tree 1030A with associated free lists 1035A, 1037A, and 1039A may be similar to those illustrated in FIG. 8, but with the entries for PFN 0 and PFN 7 reversed. A single-page allocation method may proceed as follows. At a first operation 1042A, the memory allocator may search the tree 1030A to find the node having the lowest VOL. In this example, node 1036A may have the lowest WOL (WOL=1). At a second operation 1044A, the memory allocator may look up a free page from the highest group level of the WOL-specific free list 1037A associated with node 1036A. In this example, the memory page at PFN 0 (which may be referred to as a target page) is the free page at the highest group level of the free list associated with the lowest WOL. The memory allocator may then allocate the target page (PFN 0) in response to the single-page allocation request.

Referring to FIG. 108, at a third operation 1046A, the memory allocator may remove the target page (PFN 0) from the free list 1037A. At a fourth operation 1048A, the memory allocator may clear the entry 0(1) from Level 3 of the page state map 1002B.

Depending on the implementation details, the single-page allocation method illustrated in FIG. 10 may be implemented with a time complexity of O(1).

Figure 11A:
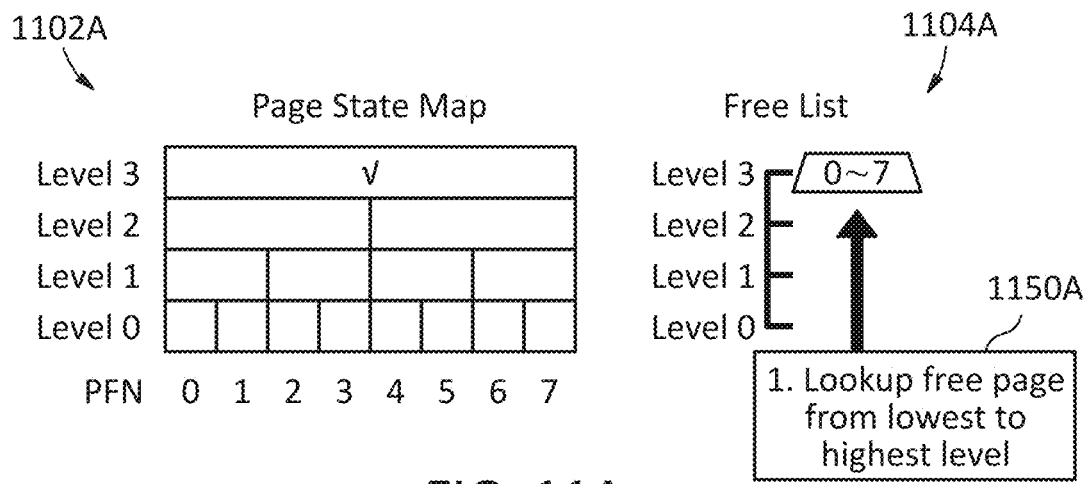
FIG. 11A illustrates an example embodiment of a buddy page allocation method with group page management showing data structures in a first state prior to a page allocation in accordance with example embodiments of the disclosure.
Figure 11B:
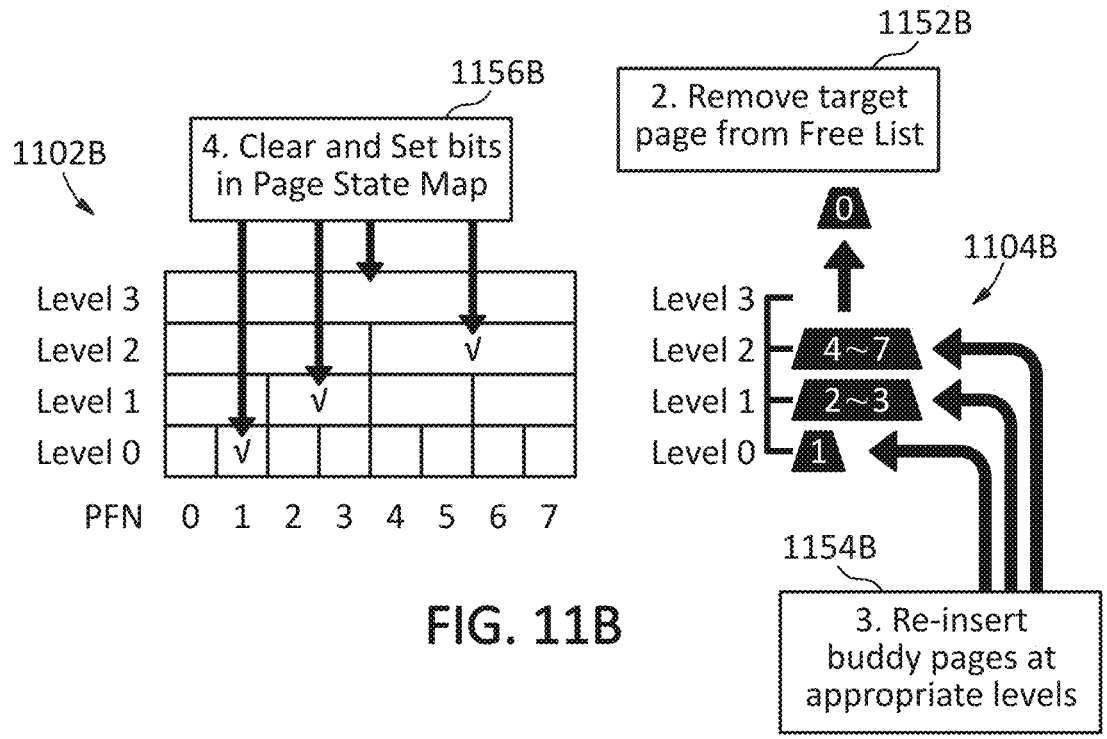
FIG. 11B illustrates an example embodiment of a buddy page allocation method with group page management showing data structures in a second state after a page allocation in accordance with example embodiments of the disclosure.

FIG. 11A and FIG. 11B, which collectively form FIG. 11, illustrate an example embodiment of a buddy page allocation method with group page management in accordance with example embodiments of the disclosure.

Referring to FIG. 11A, the initial states of a page state map 1102A and a free list 1104A may be similar to those shown in FIG. 4A. At a first operation 1150A, a memory allocator may search for a free page starting at the lowest level of the free list 1104A. The memory allocator may continue a lowest-to-highest search until finding eight free pages at Level 3. The memory page at PFN 0 may be selected as a target page randomly, or based on a predetermined pattern (e.g., lowest PFN first, highest PFN first, and/or the like), but without awareness of a WOL of any pages. The memory allocator may then allocate PFN 0.

Referring to FIG. 11B, at a second operation 1152B, the memory allocator may remove the target memory page at PFN 0 from Level 3 of free list 1104A. At a third operation 1154B, the memory allocator may reinsert the remaining buddy pages PFN 1 through PFN 7 at the appropriate levels of the free list 1104A. At a fourth operation 1156B, the memory allocator may clear the bit (e.g., check marks) at Level 3 of the page state map 1156B and set the appropriate bits (e.g., check marks) at Level 0 through Level 2 of the page state map 1102B.

Depending on the implementation details, the single-page allocation method illustrated in FIG. 11 may be implemented with a time complexity of O(log n).

Figure 12A:
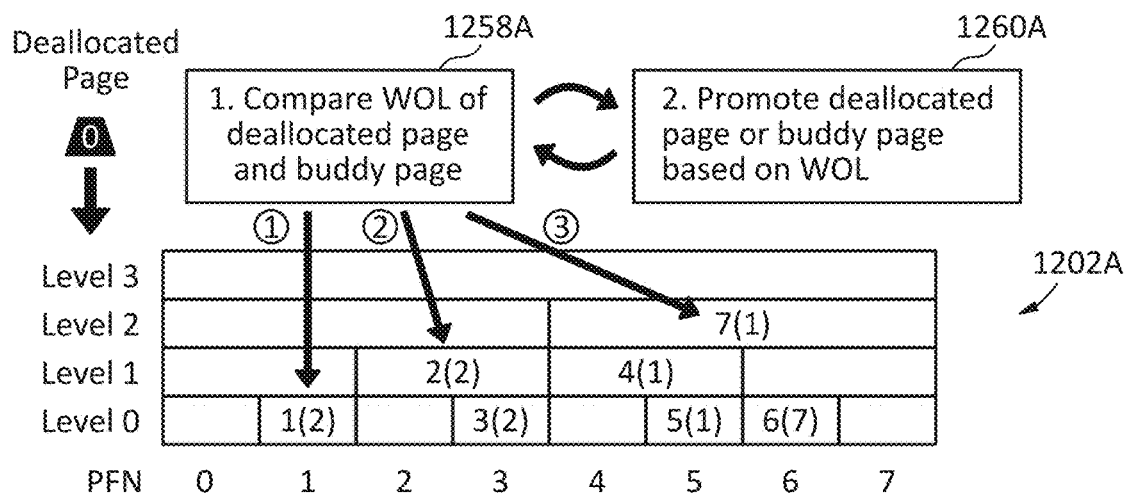
FIG. 12A illustrates an example embodiment of a single-page wear-level aware buddy page deallocation method showing data structures in a first state prior to a page deallocation in accordance with example embodiments of the disclosure.
Figure 12A:
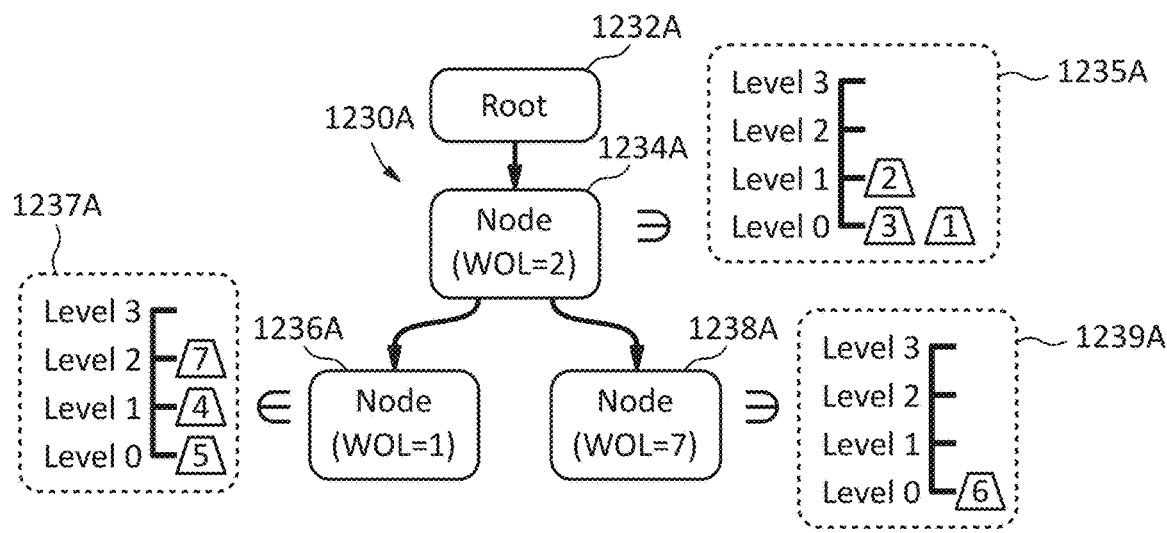
Figure 12B:
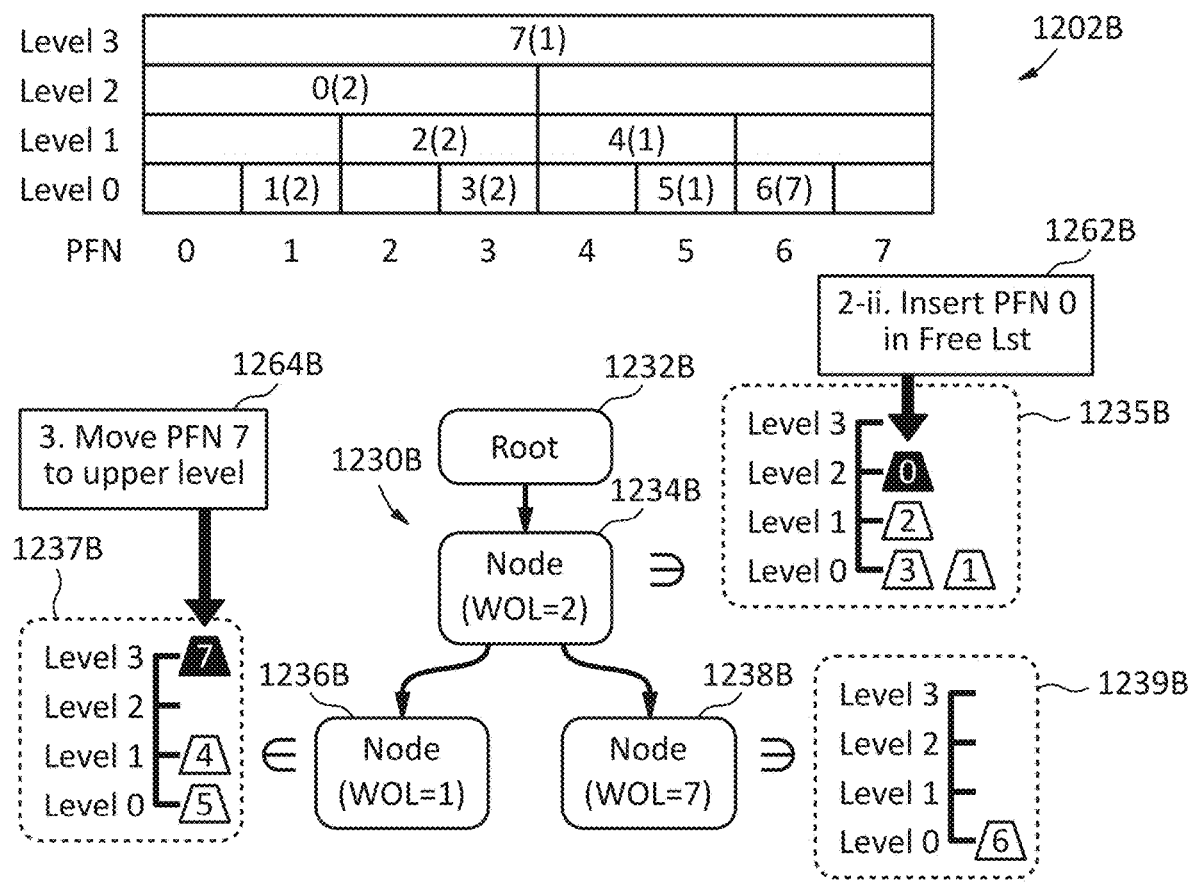
FIG. 12B illustrates an example embodiment of a single-page wear-level aware buddy page deallocation method showing data structures in a second state after a page deallocation in accordance with example embodiments of the disclosure.

FIG. 12A and FIG. 12B, which collectively form FIG. 12, illustrate an example embodiment of a single-page wear-level aware buddy page deallocation method in accordance with example embodiments of the disclosure. The embodiment illustrated in FIG. 12 may be implemented, for example, using a hybrid data structure similar to that illustrated in FIG. 8, and a buddy memory allocator similar to that illustrated in FIG. 3. The method illustrated in FIG. 12 may be initiated, for example, when a single memory page is no longer needed and ready for deallocation.

Referring to FIG. 12A, the method may begin when the memory page at PFN 0 is deallocated. While it was allocated, the memory page at PFN 0 may have been written one or more times such that it may now have a WOL of 2. Thus, the entry for PFN 0 in the page state map 1202A may be designated as 0(2).

At a first iteration ① of a first operation 1258A, the memory allocator may compare the WOL of the deallocated page to the WOL of its buddy page at the lowest level (Level 0). At a first iteration of a second operation 1260A, either the deallocated page or the corresponding buddy page may be promoted to the next higher level based, for example, on the following algorithm:

--- if the WOL of the buddy page is less than the WOL of the deallocated page
{
i. remove the buddy page from the current level
ii. insert the deallocated page at the current level
iii. the buddy page takes the place of the deallocated page at the next higher level
}
else promote the deallocated page to the next higher level

---

The method may then iteratively proceed between the first operation 1258A and the second operation 1260A until it reaches the highest level at which the deallocated page may be inserted.

In the example illustrated in FIG. 12, at the first iteration the WOL of 0(2) is the same as its buddy page 1(2), and therefore, the deallocated page 0(2) may be promoted to Level 1. At a second iteration ②, the WOL of the deallocated page 0(2) may be compared to the WOL of the buddy page at the next level (Level 1). In this example, the WOL of the buddy page 2(2) at Level 1 is again 2. Thus, the deallocated page 0(2) may be promoted to Level 2. At a third iteration ③, the WOL of the deallocated page 0(2) may be compared to the WOL of the buddy at Level 2.

If at any level, however, the WOL of the deallocated page is less than the WOL of the buddy page, the buddy page may be removed from that level, the deallocated page may be inserted at that level, the buddy page may be promoted to the next level, and the buddy page may take the place of the deallocated page for purposes of further WOL comparisons at one or more higher levels.

In this example, the WOL of the buddy page 7(1) at Level 2 is 1. Thus, page 7(1) may be removed from Level 2, the deallocated page 0(2) may be inserted at Level 2, and the page 7(1) may be promoted to Level 3. Because Level 3 is the highest level, the second operation may terminate with no further comparisons.

Referring to FIG. 12B, at a second part (part ii, of the algorithm described above) of the second operation 1262B, the page 0(2) may be inserted at Level 2 of the WOL=2 free list 1235B. At a third operation 1264B, the memory page at PFN 7 may be promoted to Level 3 of the WOL=1 free list 1237B.

Thus, a free page having the lowest WOL may end up at the highest level, and in the event of a WOL tie between pages at any level, the more recently deallocated page may be promoted to the next level. Therefore, the PFN of a free page at any level may depend on which page was most recently deallocated.

In some embodiments, as illustrated in FIG. 12, a wear-level aware buddy page deallocation method in accordance with example embodiments of the disclosure may not coalesce free pages at the time of deallocation. Depending on the implementation details, this may reduce or eliminate the need to split coalesced pages in response to a single-page allocation request. This may beneficial, for example, in many applications in which most allocation requests are single-page allocation requests.

Figure 13A:
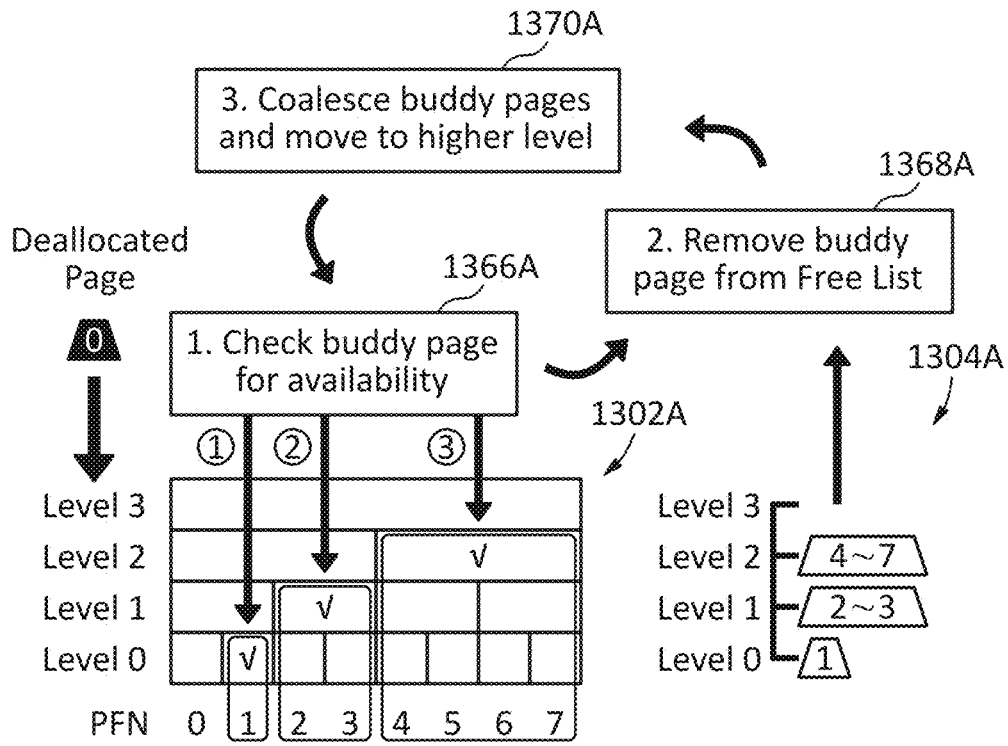
FIG. 13A illustrates an example embodiment of a buddy page deallocation method with group page management showing data structures in a first state prior to a page deallocation in accordance with example embodiments of the disclosure.
Figure 13B:
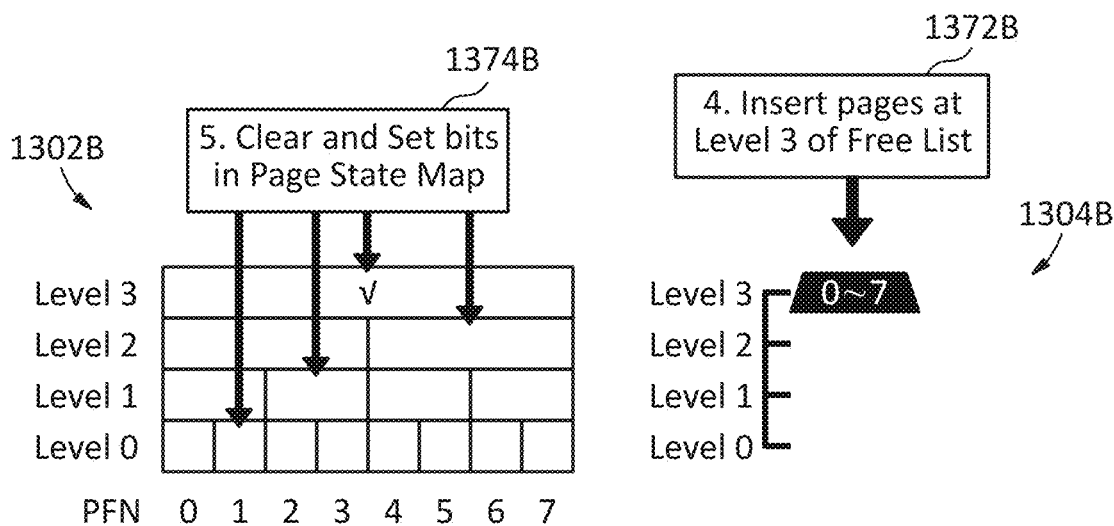
FIG. 13B illustrates an example embodiment of a buddy page deallocation method with group page management showing data structures in a second state after a page deallocation in accordance with example embodiments of the disclosure.

FIG. 13A and FIG. 13B, which collectively form FIG. 13, illustrate an example embodiment of a buddy page deallocation method with group page management in accordance with example embodiments of the disclosure.

Referring to FIG. 13A, the method may begin when the memory page at PFN 0 is deallocated. At a first iteration W of a first operation 1366A, the buddy page PFN 1 of the deallocated page PFN 0 may be checked for availability. If the buddy page is available, then at a second operation 1368A, the buddy page may be removed from the free list, and at a third operation 1370A, the buddy page PFN 1 may be coalesced with the deallocated page PFN 0.

The first, second, and third operations may be repeated at iterations ② and ③ if the buddy page at each level continues to be available. In this example, the buddy page is available at each level, and therefore, the buddy pages continue to be coalesced at each level.

Referring to FIG. 13B, after all of the pages are coalesced, at a fourth operation 1372B, all eight pages may be inserted into the free list at Level 3. At a fifth operation 1374B, the bit for Level 3 in the page state map 1304B may be set.

Figure 14A:
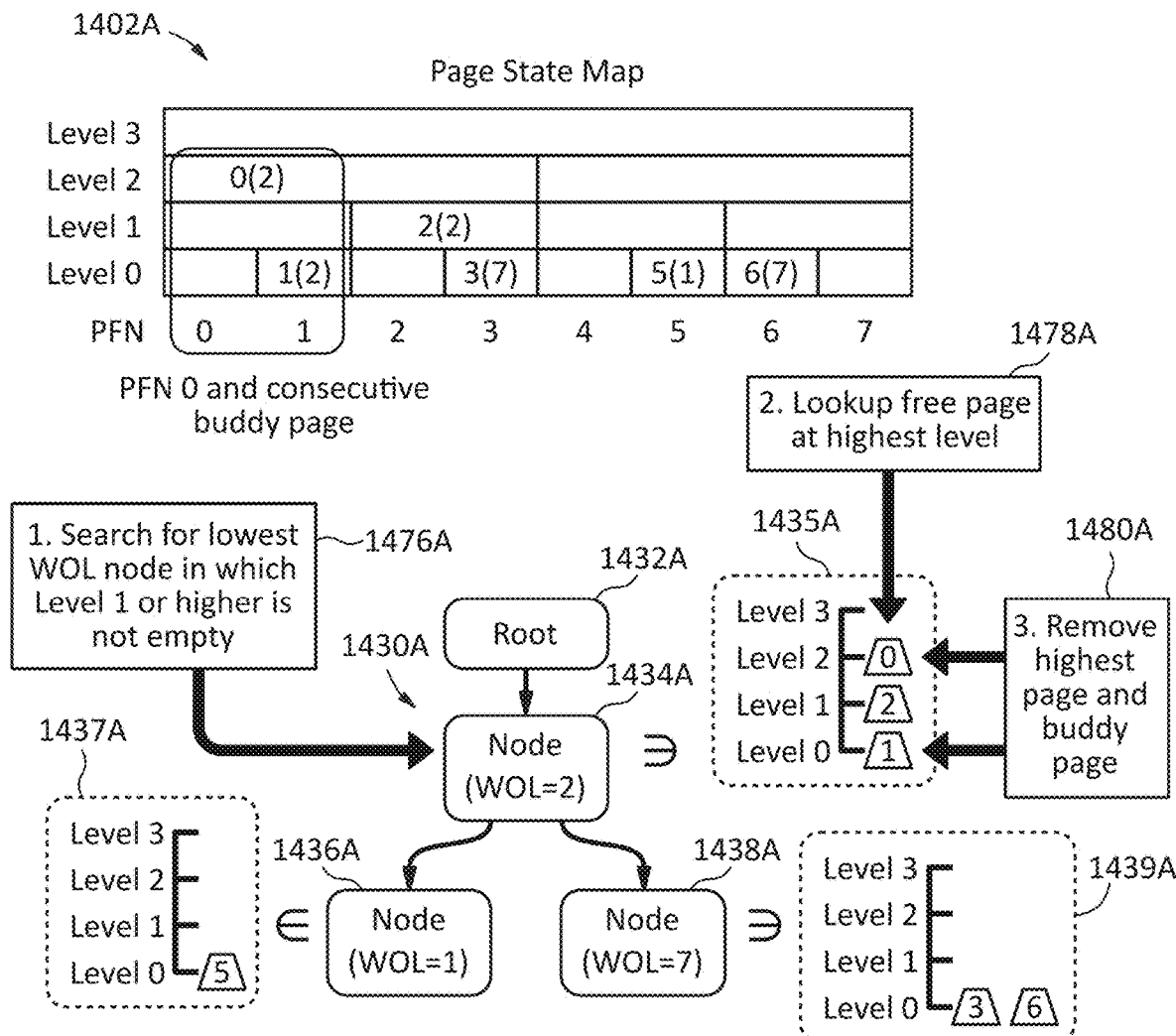
FIG. 14A illustrates an example embodiment of a multi-page wear-level aware buddy page allocation method showing data structures in a first state prior to a multi-page allocation in accordance with example embodiments of the disclosure.
Figure 14B:
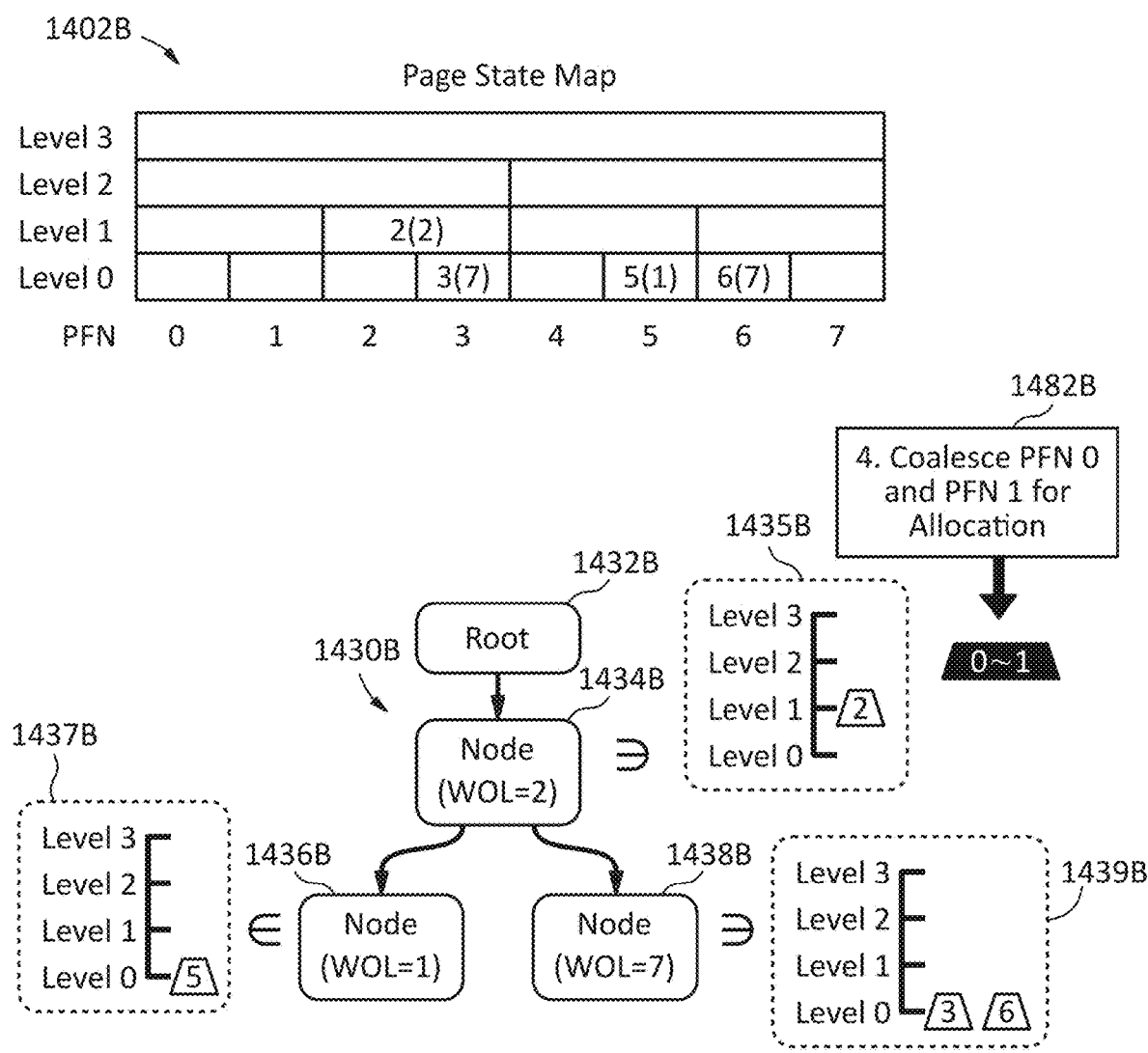
FIG. 14B illustrates an example embodiment of a multi-page wear-level aware buddy page allocation method showing data structures in a second state after a multi-page allocation in accordance with example embodiments of the disclosure.

FIG. 14A and FIG. 14B, which collectively form FIG. 14, illustrate an example embodiment of a multi-page wear-level aware buddy page allocation method in accordance with example embodiments of the disclosure. The embodiment illustrated in FIG. 14 may be implemented, for example, using a hybrid data structure similar to that illustrated in FIG. 8, and a buddy memory allocator similar to that illustrated in FIG. 3. The method illustrated in FIG. 14 may be initiated, for example, by a multiple-page allocation request received by a buddy memory allocator.

Referring to FIG. 14A, the method may be initiated by a request to allocate two consecutive memory pages. Because two consecutive buddy pages may be allocated at Level 1, at a first operation 1476A, the memory allocator may search the tree 1430A for the node having the lowest WOL for which Level 1 or higher is not empty (e.g., includes one or more entries for free pages). In this example, node 1434A for WOL=2 may have the lowest WOL for which Level 1 or higher is not empty. At a second operation 1478A, the memory allocator may look up the free page at the highest level of the free list 1435A associated with the WOL=2 node, along with a free buddy page to form a group of two consecutive pages. In this example, page 0(2) and 1(2) may be the highest free page and the buddy page. At a third operation 1480A, the memory allocator may remove the highest page and the buddy page from the free table 1435A associated with the WOL=2 node.

Referring to FIG. 14B, at a fourth operation 14828, the memory allocator may coalesce the two memory pages at PFN 0 and PFN 1 which may then be allocated in response to the allocation request. Thus, the entries for 0(2) and 1(2) may be removed from the page state map 1402B.

Thus, a multi-page wear-level aware buddy page allocation method in accordance with example embodiments of the disclosure may allocate multiple consecutive pages while still managing pages individually (e.g., to manage the WOL of individual pages). Depending on the Implementation details, this may increase the lifetime of non-volatile memory, such as flash memory in an SSD, PCM, nonvolatile RAM (NVRAM) and/or other types of memory having limited write endurance.

Depending on the implementation details, a multi-page wear-level aware buddy page allocation method in accordance with example embodiments of the disclosure may be implemented, for example, with a complexity of O(n).

Figure 15:
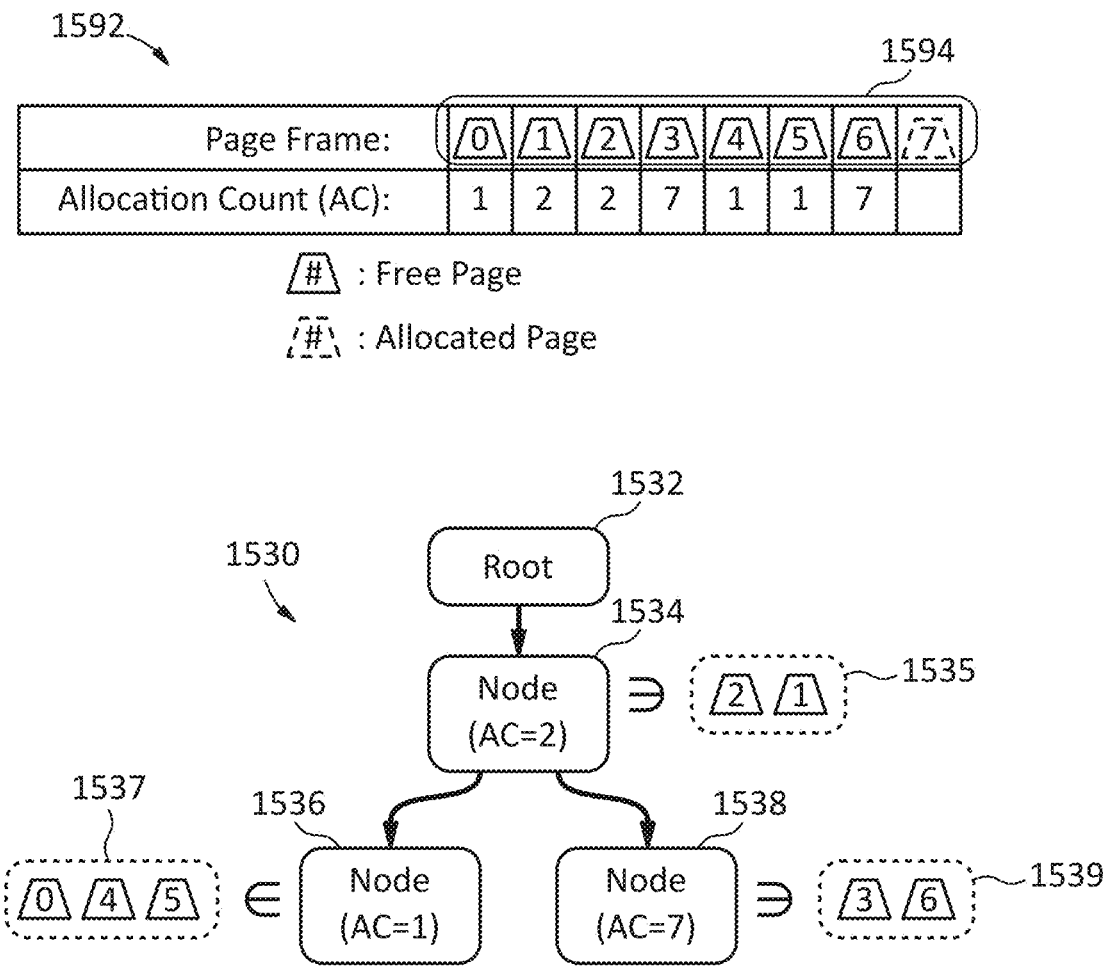
FIG. 15 illustrates an example embodiment of a method for dividing memory pages into page units in accordance with example embodiments of the disclosure.

FIG. 15 illustrates an example embodiment of a method for dividing memory pages into page units in accordance with example embodiments of the disclosure. The embodiment illustrated in FIG. 15 may be used, for example, to determine the first page for a group of buddy pages that may be allocated based on a multi-page allocation request. For purposes of illustration, the embodiment illustrated in FIG. 15 may use one or more allocation counts to determine a WOL for each page, but in other embodiments, any other technique may be used to determine one or more WOLs.

Referring to FIG. 15, a page frame table 1592 may include a top row having a list of page frame numbers, for example, PFN 0 through PFN 7 and a bottom row having a corresponding allocation count (AC) for each memory page corresponding to the PFN. Free pages may be indicated by solid outlines, and allocated pages may be indicated by dashed outlines.

The method illustrated in FIG. 15 may use a tree structure 1530 having a root node 1532, a node 1534 for an allocation count of two (AC=2), a node 1536 for AC=1, and a node 1538 for AC=7. A list 1535 of free memory pages having AC=2 may be associated with node 1534. For example, the list 1535 may be an element of the node 1534 (as indicated by the symbol e), or the node 1534 may include a pointer or link to access the list 1535 from the node 1534. Similarly, a list 1537 of free memory pages having AC=1 may be associated with node 1536, and a list 1539 of free memory pages having AC=7 may be associated with node 1538. The tree structure 1530 may be created and/or updated, for example, by assigning each memory page in the top row of page frame table 1592 to a node of the tree structure 1530 corresponding to the AC of the memory page.

In some embodiments, the method illustrated in FIG. 15 may be used to determine one or more buddy pages in a contiguous memory address space for a selected page. For example, given a selected page, one or more equations may be used to find a first page of a buddy group having a size indicated by a group level.

In some embodiments, the group level (GL) may indicate the number of consecutive pages in the buddy group. For example, the number of pages (NP) in a group may equal the level number plus one. Thus, for Level 3 (GL=3), there may be four pages in a group (NP=4). Referring to FIG. 15, if a user requests a group of eight consecutive pages 1594 (GL=3), the first page of PFN 0 through PFN 7 may be PFN 0. Similarly, the first page of a group of four consecutive pages PFN 0 through PFN 3 (GL=2) may be PFN 0, and the first page of a group of four consecutive pages PFN 4 through PFN 7 (GL=2) may be PFN 4.

An example equation that may be used to find a first page (FP) of a buddy group having a size indicated by a requested group level based on a selected page (SP) may be as follows:

$$\text{First Page} = \text{Selected Page}\ \&\ \sim((1 \ll \text{Group Level}) - 1) \quad \text{(Eq. 1)}$$

where & indicates a logical AND operation, ~ indicates a logical NOT operation, and << indicates a logical shift left.

In some embodiments, the tree structure 1530 may be implemented with any type of data tree such as a binary search tree, a B-tree, and/or the like, that may be searched to find a node with a specific AC (e.g., the lowest AC in the tree). The root node 1532 may serve as a starting point for a search. In some embodiments, any or all of the page frame table 1592, tree 1530, and/or lists 1535, 1537, and 1539 may form a hybrid data structure that may enable a buddy memory allocator to implement wear-out (WO) management (e.g., using the tree 1530), manage individual free pages (e.g., using lists 1535, 1537, and/or 1539), and/or check the free status and/or AC of buddy pages and/or groups of pages in accordance with example embodiments of the disclosure. In some embodiments, nodes may be added to and/or removed from the tree 1530 based on the presence and/or absence of memory pages having an AC associated with the specific node.

Figure 16A:
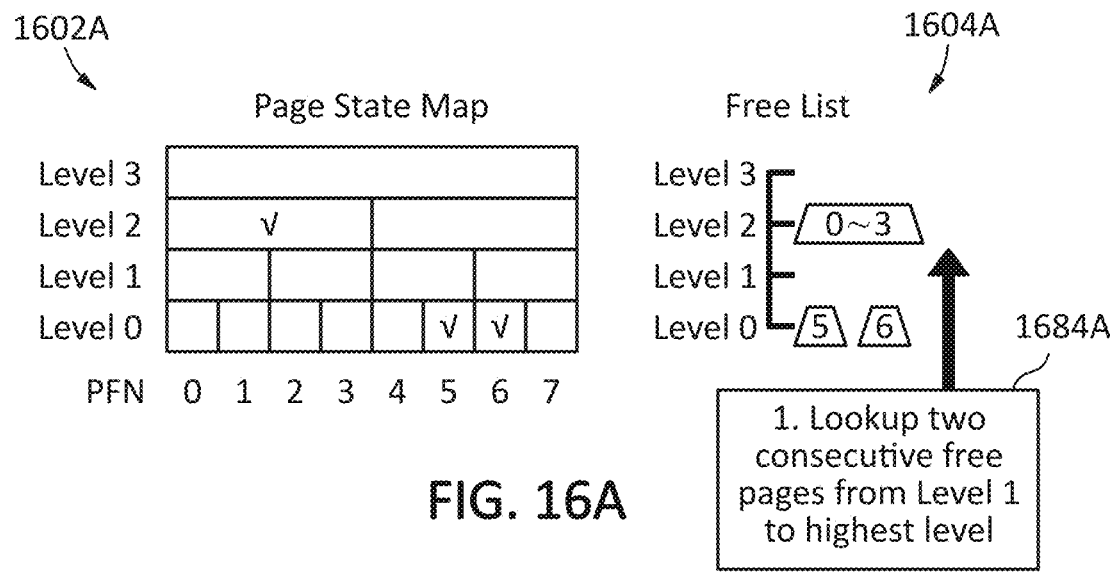
FIG. 16A illustrates an example embodiment of a buddy page allocation method with group page management showing data structures in a first state prior to a multi-page allocation in accordance with example embodiments of the disclosure.
Figure 16B:
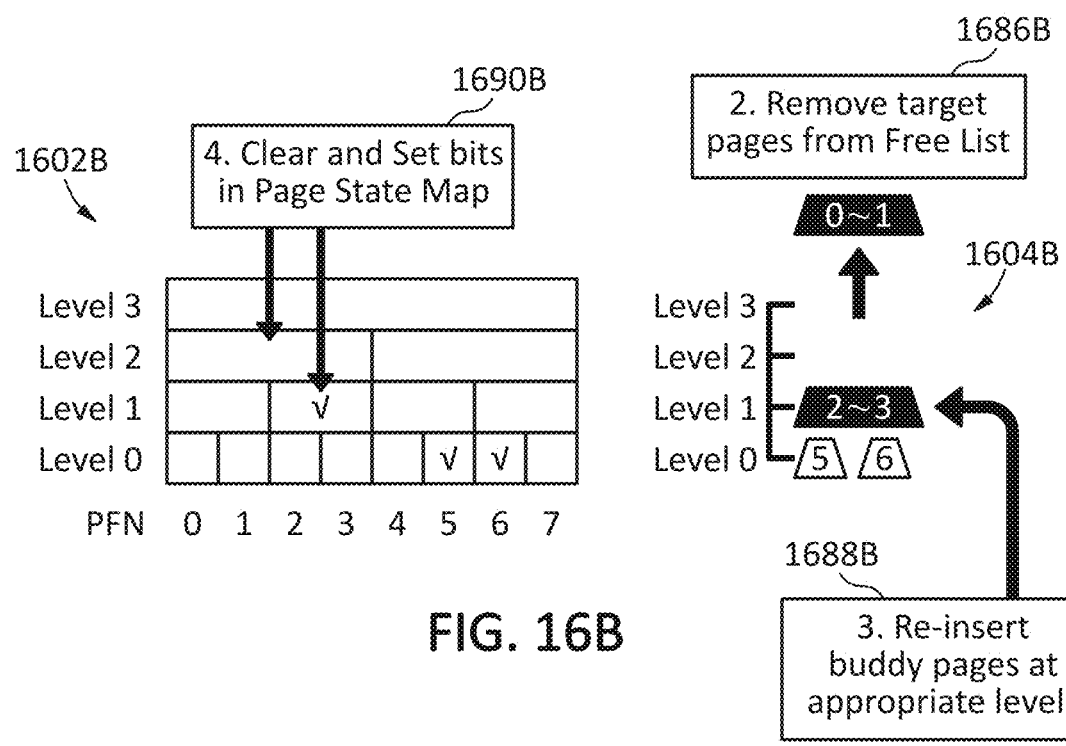
FIG. 16B illustrates an example embodiment of a buddy page allocation method with group page management showing data structures in a second state after a multi-page allocation in accordance with example embodiments of the disclosure.

FIG. 16A and FIG. 16B, which collectively form FIG. 16, illustrate an example embodiment of a buddy page allocation method with group page management in accordance with example embodiments of the disclosure.

Referring to FIG. 16A, the method may be initiated by an allocation request for two consecutive memory pages. At a first operation 1684A, a memory allocator may look up the first instance of two consecutive free pages beginning at Level 1 (because the allocation request is for two consecutive pages) and progressing from low-to-high in the free list 1604A. In this example, the first two consecutive free pages PFN 0 and PFN 1 may be found at Level 2.

Referring to FIG. 16B, at a second operation 1686B, the memory allocator may remove the two consecutive free pages PFN 0 and PFN 1 from the free list 1604B. At a third operation 1688B, the memory allocator may re-insert the buddy pages PFN 2 and PFN 3 in the free list 1604B, this time at Level 1 because there are only two consecutive free pages. At a fourth operation 1690B, the memory allocator may clear and set bits in the page state map 1602B to reflect the allocation of pages PFN 0 and PFN 1.

Depending on the implementation details, the multi-page allocation method illustrated in FIG. 16 may be implemented with a time complexity of O(log n).

In some embodiments, when device-attached memory is mapped or otherwise made available to a memory allocator (e.g., at a host), the number of write operations performed by a memory page may not be visible to the memory allocator and/or system software. For example, device NVM at an SSD may be exposed to a host memory allocator through CXL.mem as illustrated in FIG. 1. In some embodiments in accordance with the disclosure, a system may use hardware to count the number of write cycles for one or more memory pages. The memory allocator may use these numbers to allocate memory pages in a manner that may provide wear leveling for the device NVM.

Figure 17:
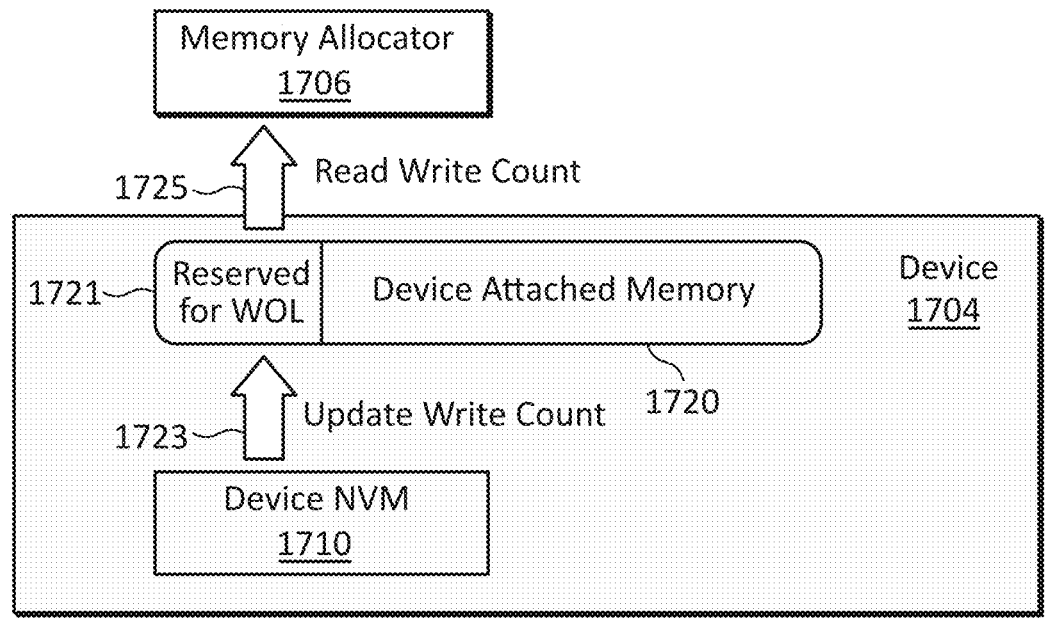
FIG. 17 illustrates an example embodiment of a system for storing WOL information for memory pages in a wear-level aware memory allocation scheme in accordance with example embodiments of the disclosure.

FIG. 17 illustrates an example embodiment of a system for storing WOL information for memory pages in a wear-level aware memory allocation scheme in accordance with example embodiments of the disclosure. In the system illustrated in FIG. 17, a device 1704 may include a device NVM 1710 which may be exposed as device-attached memory 1720, for example, through a memory protocol such as CXL.mem. A reserved portion 1721 of the device-attached memory 1720 may be reserved for WOL information for one or more memory pages in the device NVM 1710. In this example, the device 1704 may have access to write count information for the device NVM 1710 (e.g., by an FTL if the device 1704 is implemented as an SSD). Therefore, the device 1704 may update the WOL information in the reserved portion 1721 based on actual write information for the device NVM 1710 as shown by arrow 1723.

A memory allocator 1706 may access the WOL information in the reserved portion 1721 of the device-attached memory 1720 as shown by arrow 1725 and use the WOL information to implement a wear-level aware memory allocation scheme, for example, as described above.

Figure 18:
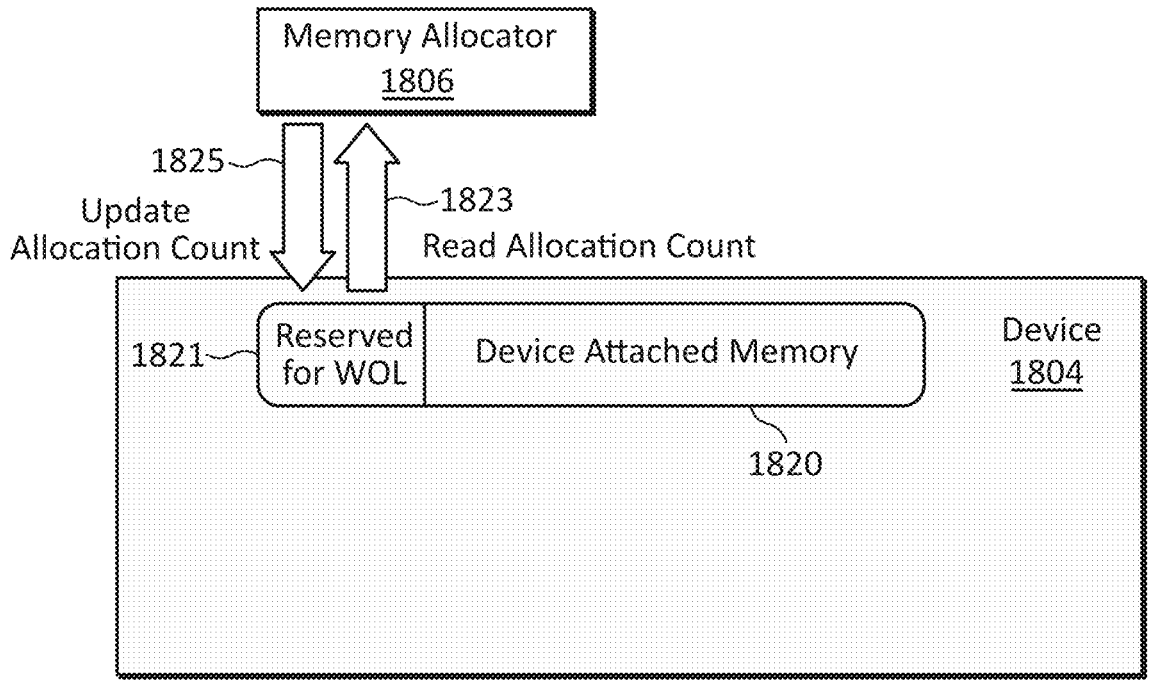
FIG. 18 illustrates another example embodiment of a system for storing WOL information for memory pages in a wear-level aware memory allocation scheme in accordance with example embodiments of the disclosure.

FIG. 18 illustrates another example embodiment of a system for storing WOL information for memory pages in a wear-level aware memory allocation scheme in accordance with example embodiments of the disclosure. In the system illustrated in FIG. 18, a device 1804 may include a device-attached memory 1820. A reserved portion 1821 of the device-attached memory 1820 may be reserved for WOL information.

In the embodiment illustrated in FIG. 18, however, the device 1804 may not have access to memory write count information. Thus, the memory allocator 1806 may store allocation count information (which may have a positive correlation with write count information) in the reserved portion 1821 of the device-attached memory 1820 as shown by arrow 1823. The memory allocator 1806 may access the WOL information in the reserved portion 1821 of the device-attached memory 1820 as shown by arrow 1825 and use the WOL information to implement a wear-level aware memory allocation scheme, for example, as described above.

In some embodiments, a combination of a write count, an allocation count, and/or any other wear-related metric may be used to determine a WOL for one or more memory pages.

Figure 19:
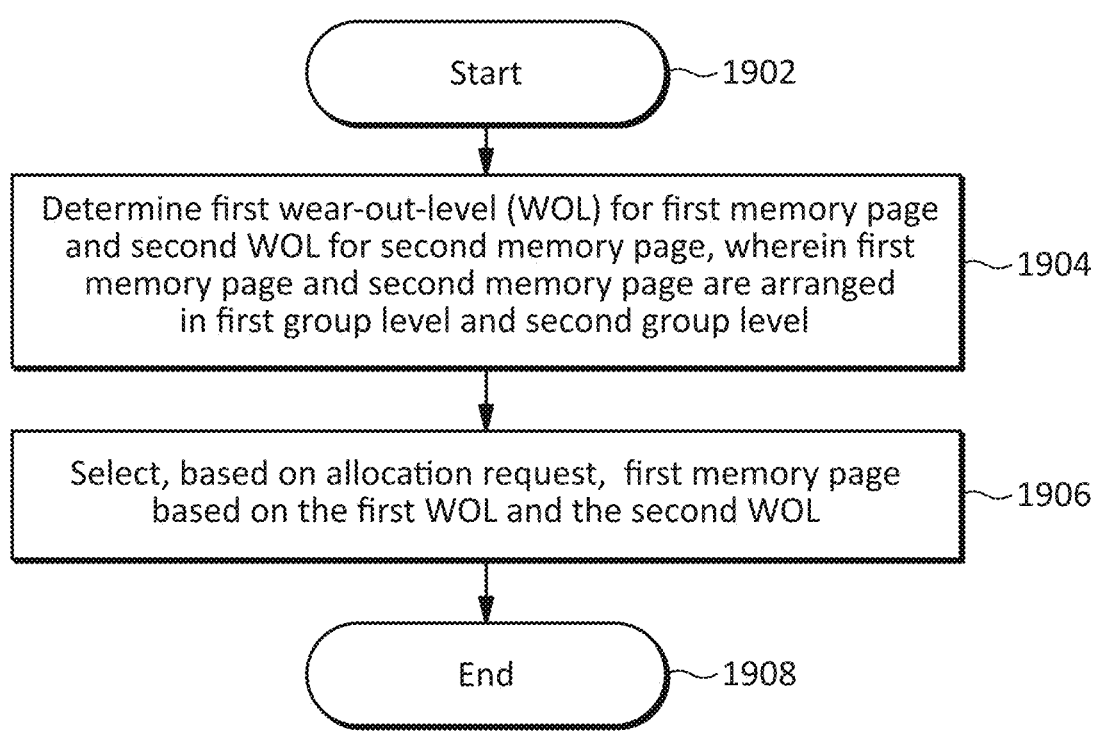
FIG. 19 illustrates an embodiment of a method for memory allocation in accordance with example embodiments of the disclosure.

FIG. 19 illustrates an embodiment of a method for memory allocation in accordance with example embodiments of the disclosure. The method may begin at operation 1902. At operation 1904, the method may determine a first wear-out-level (WOL) for a first memory page and a second WOL for a second memory page, wherein the first memory page and the second memory page are arranged in a first group level and a second group level. In some embodiments, the WOL may be based on a write count for the first memory page, an allocation count for the first memory page, and/or a combination thereof. At operation 1906, the method may select, based on an allocation request, the first memory page based on the first WOL and the second WOL. The first memory page may then be allocated based on the allocation request. The method may end at operation 1908.

Figure 20:
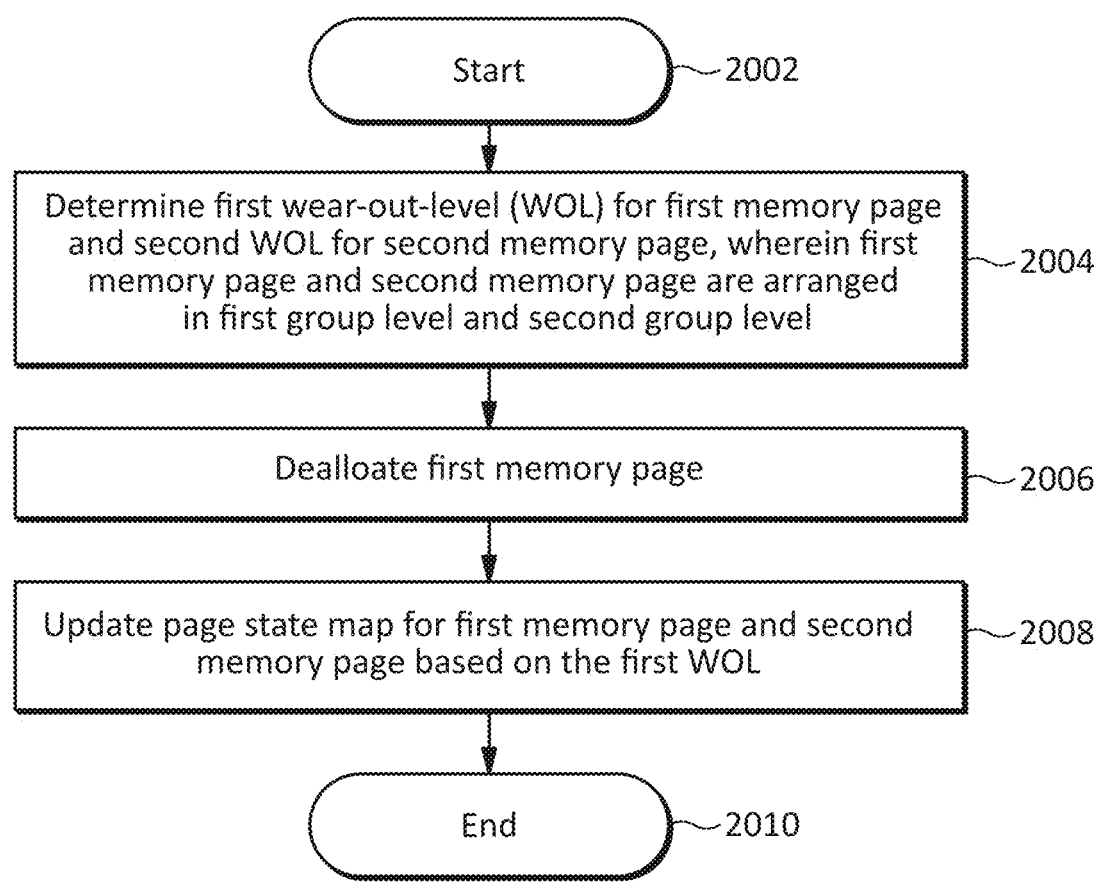
FIG. 20 illustrates an embodiment of a method for memory deallocation in accordance with example embodiments of the disclosure.

FIG. 20 illustrates an embodiment of a method for memory deallocation in accordance with example embodiments of the disclosure. The method may begin at operation 2002. At operation 2004, the method may determine a first wear-out-level (WOL) for a first memory page and a second WOL for a second memory page, wherein the first memory page and the second memory page are arranged in a first group level and a second group level. At operation 2006, the method may deallocate the first memory page. At operation 2008, the method may update a page state map for the first memory page and the second memory page based on the first WOL. In some embodiments, the first memory page may be consecutive with the second memory page, and the page state map may be updated by associating the first memory page with the first group level based on the first WOL and the second WOL. The method may end at operation 2010.

The embodiment illustrated in FIG. 19 and FIG. 20, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

Some embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to an integrated circuit may refer to all or only a portion of the integrated circuit, and a reference to a block may refer to the entire block or one or more subblocks. The use of terms such as "first" and "second" in this disclosure and the claims may only be for purposes of distinguishing the things they modify and may not indicate any spatial or temporal order unless apparent otherwise from context. In some embodiments, a reference to a thing may refer to at least a portion of the thing, for example, "based on" may refer to "based at least in part on," and/or the like. A reference to a first element may not imply the existence of a second element. The principles disclosed herein have independent utility and may be embodied individually, and not every embodiment may utilize every principle. However, the principles may also be embodied in various combinations, some of which may amplify the benefits of the individual principles in a synergistic manner.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method for memory allocation, the method comprising:
   determining an amount of use for a first memory page, wherein the first memory page is mapped to a first page group of a first group level, a second memory page is mapped to a second page group of the first group level, and the first memory page and the second memory page are mapped to a third page group of a second group level;
   selecting, based on an allocation request, the first memory page based on the amount of use, including searching a data structure based on the amount of use; and
   selecting a free list based on searching the data structure, wherein the free list indicates a group of memory pages of a same wear out level and the selecting the first memory page from the free list is based on the group level of the first memory page.

2. The method of claim 1, wherein the amount of use comprises a first amount of use, the method further comprising:
   determining a second amount of use for the second memory page;
   wherein the first memory page is selected based on the first amount of use and the second amount of use.

3. The method of claim 2, wherein the first amount of use is based on a write count for the first memory page.

4. The method of claim 2, wherein the first amount of use is based on an allocation count for the first memory page.

5. The method of claim 2, further comprising associating the first memory page with the second group level based on the first amount of use and the second amount of use, wherein the second group level is a highest group level.

6. The method of claim 2, wherein selecting the first memory page comprises:
   searching a data structure based on the first amount of use; and
   selecting a free list based on searching the data structure based on the first amount of use.

7. The method of claim 6, wherein:
   the data structure comprises a tree comprising a node for the first amount of use; and
   the node comprises the free list.

8. The method of claim 6, wherein selecting the first memory page further comprises selecting the first memory page from the free list based on the group level of the first memory page.

9. The method of claim 8, wherein:
   the first amount of use comprises a lowest amount of use; and
   the group level of the first memory page comprises a highest group level.

10. The method of claim 9, further comprising:
    removing the first memory page from the free list; and
    updating a page state map for the first memory page and the second memory page based on removing the first memory page from the free list.

11. The method of claim 10, wherein an entry of the page state map comprises an amount of use.

12. The method of claim 2, wherein the first memory page and the second memory page are consecutive memory pages, the method further comprising:
    coalescing the first memory page and the second memory page to generate a group of coalesced memory pages based on the allocation request; and
    allocating the group of coalesced memory pages to one or more processes.

13. The method of claim 12, wherein selecting the first memory page and selecting the second memory page comprises:
    searching a data structure based on the first amount of use; and
    selecting a free list based on searching the data structure.

14. The method of claim 13, wherein selecting the first memory page and selecting the second memory page further comprises:
    selecting the first memory page from the free list based on the group level of the first memory page; and
    selecting the second memory page comprises selecting a memory page that is consecutive with the first memory page.

15. The method of claim 13, wherein selecting the free list comprises selecting a free list corresponding to a lowest amount of use having an available page corresponding to the group level for the first memory page.

16. The method of claim 2, further comprising:
storing the first amount of use in a memory; and
reading, by a host memory allocator, the first amount of use;
wherein:
storing the first amount of use in the memory comprises storing, by a device, a first write count for the first memory page in the memory; and
the memory comprises a device-attached memory attached to the device.

17. An apparatus comprising:
a memory allocator configured to:
select, based on an allocation request, a first memory page based on an amount of use, from a free list comprising a first entry for the first memory page at a group level and a second entry for a second memory page at the group level, wherein the selecting includes searching a data structure based on the amount of use and selecting the free list based on searching the data structure, wherein the free list indicates a group of memory pages of a same wear out level and the selecting the first memory page from the free list is based on the group level of the first memory page.

18. The apparatus of claim 17, wherein the group level comprises a first group level, and the memory allocator is configured to:
allocate the first memory page at the first group level to one of one or more processes; and
allocate the second memory page and a third memory page at a second group level to the one or more processes, wherein the third memory page is consecutive with the second memory page.

19. A system comprising:
a device comprising a first memory page and a second memory page; and
a host coupled to the device through an interconnect, the host comprising a memory allocator configured to:
determine an amount of use for the first memory page, wherein the first memory page is mapped to a first page group of a first group level, the second memory page is mapped to a second page group of the first group level, and the first memory page and the second memory page are mapped to a third page group of a second group level;
select, based on an allocation request, the first memory page based on the amount of use, including searching a data structure based on the amount of use; and
select a free list based on searching the data structure, wherein the free list indicates a group of memory pages of a same wear out level and the selection of the first memory page from the free list is based on the group level of the first memory page.

20. The system of claim 19, wherein the amount of use comprises a first amount of use, and the memory allocator is further configured to:
determine a second amount of use for the second memory page;
wherein the first memory page is selected based on the first amount of use and the second amount of use.

\* \* \* \* \*